(12) United States Patent
Park et al.

(10) Patent No.: US 11,770,526 B2
(45) Date of Patent: Sep. 26, 2023

(54) METHOD FOR ENCODING/DECODING IMAGE AND DEVICE THEREFOR

(71) Applicant: SAMSUNG ELECTRONICS CO., LTD., Suwon-si (KR)

(72) Inventors: Min-woo Park, Yongin-si (KR); Bo-ra Jin, Yongin-si (KR); Chan-yul Kim, Seongnam-si (KR); Jung-hye Min, Yongin-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/328,323

(22) Filed: May 24, 2021

(65) Prior Publication Data

US 2021/0329234 A1  Oct. 21, 2021

Related U.S. Application Data

(63) Continuation of application No. 16/092,397, filed as application No. PCT/KR2016/011303 on Oct. 10, 2016, now Pat. No. 11,019,335.

(Continued)

(51) Int. Cl.
H04N 19/119 (2014.01)
H04N 19/176 (2014.01)

(52) U.S. Cl.
CPC ......... H04N 19/119 (2014.11); H04N 19/176 (2014.11)

(58) Field of Classification Search
CPC .................... H04N 19/119; H04N 19/176
See application file for complete search history.

(56) References Cited

U.S. PATENT DOCUMENTS 8,345,762 B2 * 1/2013 Vieron ................ H04N 19/105
375/240.23
9,113,284 B2   8/2015 Hillan et al.
(Continued)

FOREIGN PATENT DOCUMENTS

CN     105308966 A    2/2016
JP     2005012439 A   1/2005
(Continued)

OTHER PUBLICATIONS

Communication dated Jun. 19, 2020 from the Korean Intellectual Property Office in application No. 10-2018-7021689.
(Continued)

Primary Examiner — Nam D Pham
(74) Attorney, Agent, or Firm — Sughrue Mion, PLLC

(57) ABSTRACT

Provided is an image decoding method of decoding an image, the image decoding method including: obtaining at least one of block shape information and split shape information about a first coding unit included in the image, from a bitstream; determining at least one second coding unit included in the first coding unit based on at least one of the block shape information and the split shape information; and decoding the image based on the at least one second coding unit, wherein the block shape information indicates a shape of the first coding unit and the split shape information indicates whether the first coding unit is split into the at least one second coding unit. Also, provided is an image encoding method corresponding to the image decoding method. Also, provided is an image encoding apparatus and image decoding apparatus for respectively performing the image encoding method and image decoding method.

1 Claim, 24 Drawing Sheets

Related U.S. Application Data

(60) Provisional application No. 62/334,004, filed on May 10, 2016.

(56) References Cited

U.S. PATENT DOCUMENTS

| | | |
|---|---|---|
| 9,247,254 B2 | 1/2016 | Guo et al. |
| 9,277,239 B2 | 3/2016 | Min et al. |
| 9,989,049 B2 | 6/2018 | Bergstedt |
| 10,284,852 B2 | 5/2019 | Possos et al. |
| 10,506,246 B2 | 12/2019 | Li et al. |
| 10,728,565 B2 | 7/2020 | Lee et al. |
| 2004/0081238 A1 | 4/2004 | Parhy |
| 2013/0077885 A1 | 3/2013 | Wang et al. |
| 2013/0195199 A1 | 8/2013 | Guo |
| 2013/0272381 A1 | 10/2013 | Guo et al. |
| 2013/0301707 A1 | 11/2013 | Lai et al. |
| 2014/0341283 A1 | 11/2014 | Choi et al. |
| 2016/0241877 A1 | 8/2016 | Min et al. |
| 2017/0013485 A1 | 1/2017 | Chang et al. |
| 2019/0356920 A1 | 11/2019 | Komiya et al. |

FOREIGN PATENT DOCUMENTS

| | | |
|---|---|---|
| JP | 2011-223303 A | 11/2011 |
| JP | 2013-219806 A | 10/2013 |
| JP | 2014-524716 A | 9/2014 |
| JP | 2014-534734 A | 12/2014 |
| JP | 2016-506187 A | 2/2016 |
| JP | 2018-536795 A | 12/2018 |
| JP | 2019-506071 A | 2/2019 |
| KR | 10-2013-0085391 A | 7/2013 |
| KR | 10-2015-0003324 A | 1/2015 |
| KR | 1020150000332 A | 1/2015 |
| KR | 1020150079519 A | 7/2015 |
| KR | 10-1617109 B1 | 4/2016 |
| WO | 2014/120369 A1 | 8/2014 |
| WO | 2014120575 A1 | 8/2014 |
| WO | 2017/123980 A1 | 7/2017 |

OTHER PUBLICATIONS

Communication dated Jul. 31, 2020 from the Intellectual Property India Patent Office in application No. 201827038249.
Communication dated Aug. 26, 2020 from the Brazilian Patent Office in application No. BR112018069135-6.
Communication dated Feb. 4, 2020, from the Japanese Patent Office in counterpart application No. 2018-554776.
Chen, Jianle et al., "Algorithm Description of Joint Exploration Test Model 2", Joint Video Exploration Team (JVET) of ITU-T SG 16 WP 3 and ISO/IEC JTC 1/SC 29/WG 11, 2nd Meeting: San Diego, USA, Feb. 20, 2016-Feb. 26, 2016, Document: JVET-B1001 v3, pp. 1-5. (10 pages total).
Li, Xiang et al., "Multi-Type-Tree", Joint Video Exploration Team (JVET) of ITU-T SG 16 WP 3 and ISO/IEC JTC 1/SC 29/WG 11, 4th Meeting: Chengdu, CN, Oct. 15, 2016-Oct. 21, 2016, Document: JVET-D0117, pp. 1-3. (3 pages total).
Communication dated Oct. 1, 2019 by the Japanese Patent Office in counterpart Japanese Patent Application No. 2018-554776.
Communication dated Nov. 14, 2019 by the European Patent Office in counterpart European Patent Application No. 16193130.8.
Search Report and Written Opinion dated Feb. 7, 2017, issued by the International Searching Authority in International Application No. PCT/KR2016/011303 (PCT/ISA/210 and PCT/ISA/237).
Communication dated Feb. 21, 2017, issued by the European Patent Office in counterpart European Application No. 16193130.8.
Wiegand, T et al., "Overview of the H.264/AVC Video Coding Standard", Jul. 1, 2003, IEEE Transactions on Circuits and Systems for Video Technology, vol. 13., No. 7, XP011221093, p. 560-576, 17 pages total.
Zheng, X., "TE3: Huawei & Hisilicon report on flexible motion partitioning coding", Jul. 23, 2010, Joint Collaborative Team on Video Coding (JCT-VC) of ITU-T SG16 WP3 and ISO/IEC JTC1/SC29/WG11, 2nd Meeting: Geneva, CH, JCTVC-B041, XP030007621, 9 pages total.
Communication dated Dec. 1, 2017, issued by the European Patent Office in counterpart European Application No. 16 193 130.8.
Communication dated Nov. 15, 2018, issued by the European Patent Office in counterpart European Application No. 16 193 130.8.
Communication dated Jun. 22, 2021 issued by the Japanese Patent Office in application No. 2020-109922.
Communication dated Dec. 3, 2021 issued by the State Intellectual Property Office of P R. China in counterpart Chinese application No. 201680085605.2.
Communication dated Feb. 8, 2022 issued by the Japanese Intellectual Property Office in counterpart Japanese Application No. 2020-109922.

\* cited by examiner

FIG. 13

| DEPTH \ BLOCK SHAPE | 0: SQUARE | 1: NS_VER | 2: NS_HOR |
|---|---|---|---|
| DEPTH D | 1300 | 1310 | 1320 |
| DEPTH D+1 | 1302 | 1312 | 1322 |
| DEPTH D+2 | 1304 | 1314 | 1324 |
| ... | ... | ... | ... |

FIG. 18

| SQUARE BLOCK | |
|---|---|
| (00)b | □ |
| (01)b | ⊞ |
| (10)b | ⊟ |
| (11)b | ◫ |

| NON-SQUARE BLOCK | |
|---|---|
| (0)b | ▭  ▯ |
| (10)b | ⊟  ◫ |
| (11)b | ⊟⊟  ◫◫ |

| SQUARE BLOCK | |
|---|---|
| (00)b |  |
| (10)b |  |
| (11)b |  |

| NON-SQUARE BLOCK | | |
|---|---|---|
| (0)b |  |  |
| (10)b |  |  |
| (11)b |  |  |

METHOD FOR ENCODING/DECODING IMAGE AND DEVICE THEREFOR

This application is a Continuation Application of U.S. patent application Ser. No. 16/092,397, filed on Oct. 9, 2018, which is a National Stage of International Application No. PCT/KR2016/011303, filed Oct. 10, 2016, and claims priority from U.S. Provisional Application No. 62/334,004, filed on May 10, 2016, the disclosures of which are incorporated herein in their entirety by reference.

TECHNICAL FIELD

A method and apparatus according to an embodiment may encode or decode an image by using various data units included in the image.

BACKGROUND ART

Image data is encoded using a codec according to a predetermined data compression standard, for example, the moving picture expert group (MPEG) standard, and then is stored in a recording medium or transmitted through a communication channel in a form of a bitstream.

With development and supply of hardware capable of reproducing and storing high resolution or high definition image content, a necessity for a codec that effectively encodes or decodes the high resolution or high definition image content is increasing. Encoded image content may be reproduced by being decoded. Recently, methods for effectively compressing such high resolution or high definition image content have been executed. For example, a method of efficiently compressing an image is performed by processing an image to be encoded via an arbitrary method.

Various data units may be used to compress an image, and an inclusion relation may exist between such data units. The data unit may be split via various methods so as to determine sizes of data units used in such image compression, and the image may be encoded or decoded as data units optimized according to characteristics of the image are determined.

DETAILED DESCRIPTION OF THE INVENTION

Technical Problem

In a conventional compression method, square coding units are determined by determining whether to split a coding unit while determining a size of the coding unit included in a picture, and then by performing a recursive split process of uniformly splitting the coding unit into four coding units having the same size.

However, in a recent situation where demand for high resolution images is rapidly increasing and a data amount required for image reproduction is increasing, it is required to perform efficient image encoding and decoding processes and at the same time, it has become apparent that the quality of a reconstruction image may be deteriorated due to the use of coding units having uniform shapes, i.e., squares.

Technical Solution

According to an aspect of an embodiment, an image decoding method of decoding an image, the image decoding method includes: obtaining at least one of block shape information and split shape information about a first coding unit included in the image, from a bitstream; determining at least one second coding unit included in the first coding unit based on at least one of the block shape information and the split shape information; and decoding the image based on the at least one second coding unit, wherein the block shape information indicates a shape of the first coding unit and the split shape information indicates whether the first coding unit is split into the at least one second coding unit.

According to an aspect of an embodiment, an image decoding apparatus for decoding an image, the image decoding apparatus includes: a bitstream obtainer configured to obtain at least one of block shape information and split shape information about a first coding unit included in the image, from a bitstream; and a decoder configured to determine at least one second coding unit included in the first coding unit based on at least one of the block shape information and the split shape information, and decode the image based on the at least one second coding unit, wherein the block shape information indicates a shape of the first coding unit and the split shape information indicates whether the first coding unit is split into the at least one second coding unit.

According to an aspect of an embodiment, an image encoding method of encoding an image, the image encoding method includes: generating a bitstream comprising at least one of block shape information and split shape information about a first coding unit included in the image; determining at least one second coding unit included in the first coding unit based on at least one of the block shape information and the split shape information; and encoding the image based on the at least one second coding unit, wherein the block shape information indicates a shape of the first coding unit, and the split shape information indicates whether the first coding unit is split into the at least one second coding unit.

According to an aspect of an embodiment, an image encoding apparatus for encoding an image, the image encoding apparatus including: a bitstream generator configured to generate a bitstream including at least one of block shape information and split shape information about a first coding unit included in the image; and an encoder configured to determine at least one second coding unit included in the first coding unit based on at least one of the block shape information and the split shape information, and encode the image based on the at least one second coding unit, wherein the block shape information indicates a shape of the first coding unit, and the split shape information indicates whether the first coding unit is split into the at least one second coding unit.

Advantageous Effects of the Invention

By using coding units having various shapes while performing encoding and decoding processes on an image, a coding unit adaptive to characteristics of the image may be used and accordingly, efficient image encoding and decoding may be performed and quality of a reconstruction image may be improved.

DESCRIPTION OF THE DRAWINGS

FIG. 13 illustrates a process of determining a depth of a coding unit when a shape and size of the coding unit changes, when a plurality of coding units are determined when the coding unit is recursively split, according to an embodiment.

FIG. 18 illustrates various shapes of a coding unit determinable based on split shape information representable in a binary code, according to an embodiment.

BEST MODE

Figure 1:
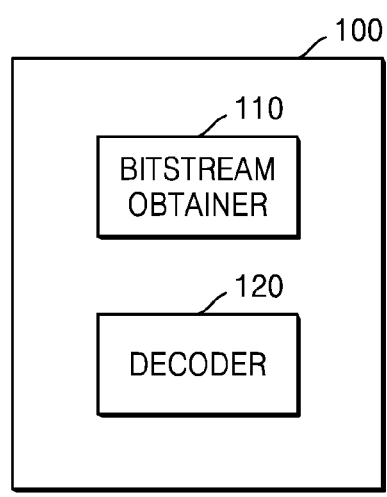
FIG. 1 is a block diagram of an image decoding apparatus capable of decoding an image based on at least one of block shape information and split shape information, according to an embodiment.

According to an aspect of an embodiment, an image decoding method of decoding an image, the image decoding method includes: obtaining at least one of block shape information and split shape information about a first coding unit included in the image, from a bitstream; determining at least one second coding unit included in the first coding unit based on at least one of the block shape information and the split shape information; and decoding the image based on the at least one second coding unit, wherein the block shape information indicates a shape of the first coding unit and the split shape information indicates whether the first coding unit is split into the at least one second coding unit.

The determining of the at least one second coding unit may include: determining a shape of the first coding unit from among a square shape and a non-square shape based on the block shape information; and determining the at least one second coding unit based on the shape of the first coding unit.

The determining of the at least one second coding unit may include determining a plurality of second coding units having a plurality of types of sizes based on the split shape information.

The obtaining of at least one of the block shape information and the split shape information may include obtaining at least one of the block shape information and the split shape information from a bitstream related to a sample at a predetermined location in the first coding unit.

The image decoding method may further include decoding the image by determining a predetermined second coding unit from the at least one second coding unit and limiting a number of times the predetermined second coding unit is split.

The decoding of the image may include decoding the image by determining a second coding unit at a predetermined location from a plurality of the at least one second coding unit and limiting a number of times the second coding unit at the predetermined location is split.

The decoding of the image may include: determining a second coding unit including a sample at the predetermined location from the at least one second coding unit; and decoding the image by limiting the number of times the determined second coding unit is split.

The image decoding method may further include: determining a reference coding unit by splitting a width and height of a largest coding unit; and determining the reference coding unit as the first coding unit.

The image decoding method may further include splitting the image according to at least one processing block including at least one largest coding unit, wherein an order of processing the at least one largest coding unit included in the at least one processing block may vary according to the at least one processing block.

The determining of the at least one second coding unit may include, when the split shape information about the first coding unit indicates that the first coding unit is split in a vertical direction and a horizontal direction, determining a plurality of second coding units by splitting the first coding unit in the vertical or horizontal direction, wherein the plurality of second coding units may not be all split in a direction perpendicular to a direction in which the first coding unit is split.

The image decoding method may further include determining a depth of each coding unit based on a length of a longer side of the first coding unit and the at least one second coding unit.

An order of processing at least one third coding unit determined when one of the at least one second coding unit is split may be determined based on a shape of a second coding unit related to the at least one third coding unit being split.

According to an aspect of an embodiment, an image decoding apparatus for decoding an image, the image decoding apparatus includes: a bitstream obtainer configured to obtain at least one of block shape information and split shape information about a first coding unit included in the image, from a bitstream; and a decoder configured to determine at least one second coding unit included in the first coding unit based on at least one of the block shape information and the split shape information, and decode the image based on the at least one second coding unit, wherein the block shape information indicates a shape of the first coding unit and the split shape information indicates whether the first coding unit is split into the at least one second coding unit.

According to an aspect of an embodiment, an image encoding method of encoding an image, the image encoding method includes: generating a bitstream including at least one of block shape information and split shape information about a first coding unit included in the image; determining at least one second coding unit included in the first coding unit based on at least one of the block shape information and the split shape information; and encoding the image based on the at least one second coding unit, wherein the block shape information indicates a shape of the first coding unit, and the split shape information indicates whether the first coding unit is split into the at least one second coding unit.

According to an aspect of an embodiment, an image encoding apparatus for encoding an image, the image encoding apparatus includes: a bitstream generator configured to generate a bitstream including at least one of block shape information and split shape information about a first coding unit included in the image; and an encoder configured to determine at least one second coding unit included in the first coding unit based on at least one of the block shape information and the split shape information, and encode the image based on the at least one second coding unit, wherein the block shape information indicates a shape of the first coding unit, and the split shape information indicates whether the first coding unit is split into the at least one second coding unit.

Mode of the Invention

Advantages and features of one or more embodiments of the present invention and methods of accomplishing the same may be understood more readily by reference to the following detailed description of the embodiments and the accompanying drawings. In this regard, the present embodiments may have different forms and should not be construed as being limited to the descriptions set forth herein. Rather, these embodiments are provided so that this disclosure will be thorough and complete and will fully convey the concept of the present embodiments to one of ordinary skill in the art.

Hereinafter, the terms used in the specification will be briefly defined, and the embodiments will be described in detail.

All terms including descriptive or technical terms which are used herein should be construed as having meanings that are obvious to one of ordinary skill in the art. However, the terms may have different meanings according to the intention of one of ordinary skill in the art, precedent cases, or the appearance of new technologies. Also, some terms may be arbitrarily selected by the applicant, and in this case, the meaning of the selected terms will be described in detail in the detailed description of the invention. Thus, the terms used herein have to be defined based on the meaning of the terms together with the description throughout the specification.

An expression used in the singular encompasses the expression of the plural, unless it has a clearly different meaning in the context.

When a part "includes" or "comprises" an element, unless there is a particular description contrary thereto, the part can further include other elements, not excluding the other elements. Also, the term "unit" in the embodiments of the present invention means a software component or hardware component such as a field-programmable gate array (FPGA) or an application-specific integrated circuit (ASIC), and performs a specific function. However, the term "unit" is not limited to software or hardware. The "unit" may be formed so as to be in an addressable storage medium, or may be formed so as to operate one or more processors. Thus, for example, the term "unit" may refer to components such as software components, object-oriented software components, class components, and task components, and may include processes, functions, attributes, procedures, subroutines, segments of program code, drivers, firmware, micro codes, circuits, data, a database, data structures, tables, arrays, or variables. A function provided by the components and "units" may be associated with the smaller number of components and "units", or may be divided into additional components and "units".

Hereinafter, an "image" may denote a static image such as a still image or a dynamic image such as a moving image, i.e., a video itself.

Hereinafter, a "sample" is data allocated to a sampling location of an image and may mean data that is a processing target. For example, pixel values in an image of a spatial domain or transformation coefficients on a transformation domain may be samples. A unit including at least one sample may be defined as a block.

Reference will now be made in detail to embodiments, examples of which are illustrated in the accompanying drawings. In the following description, well-known functions or constructions are not described in detail so as not to obscure the embodiments with unnecessary detail.

FIG. 1 is a block diagram of an image decoding apparatus 100 capable of decoding an image based on at least one of block shape information and split shape information, according to an embodiment.

Referring to FIG. 1, the image decoding apparatus 100 may include a bitstream obtainer 110 for obtaining predetermined information, such as split shape information and block shape information, from a bitstream, and a decoder 120 for decoding an image by using the obtained information, according to an embodiment. According to an embodiment, when the bitstream obtainer 110 of the image decoding apparatus 100 obtained at least one of the block shape information and the split shape information, the decoder 120 of the image decoding apparatus 100 may determine at least one coding unit for splitting an image based on at least one of the block shape information and the split shape information.

According to an embodiment, the decoder 120 of the image decoding apparatus 100 may determine a shape of a coding unit based on the block shape information. For example, the block shape information may include information indicating whether a coding unit is a square or non-square. The decoder 120 may determine a shape of a coding unit by using the block shape information.

According to an embodiment, the decoder 120 may determine, based on the split shape information, a shape according to which a coding unit is to be split. For example, the split shape information may indicate information about a shape of at least one coding unit included in a coding unit.

According to an embodiment, the decoder 120 may determine whether a coding unit is split according to the split shape information. The split shape information may include information about at least one coding unit included in a coding unit, and when the split shape information indicates that only one coding unit is included in a coding unit or that a coding unit is not split, the decoder 120 may determine that a coding unit including the split shape information is not split. When the split shape information indicates that a coding unit is split into a plurality of coding units, the decoder 120 may split the coding unit into a plurality of coding units based on the split shape information.

According to an embodiment, the split shape information may indicate how many coding units a coding unit is to be split into or a direction of splitting the coding unit. For example, the split shape information may indicate that a coding unit is split in at least one of a vertical direction and a horizontal direction or that a coding unit is not split.

Figure 3:
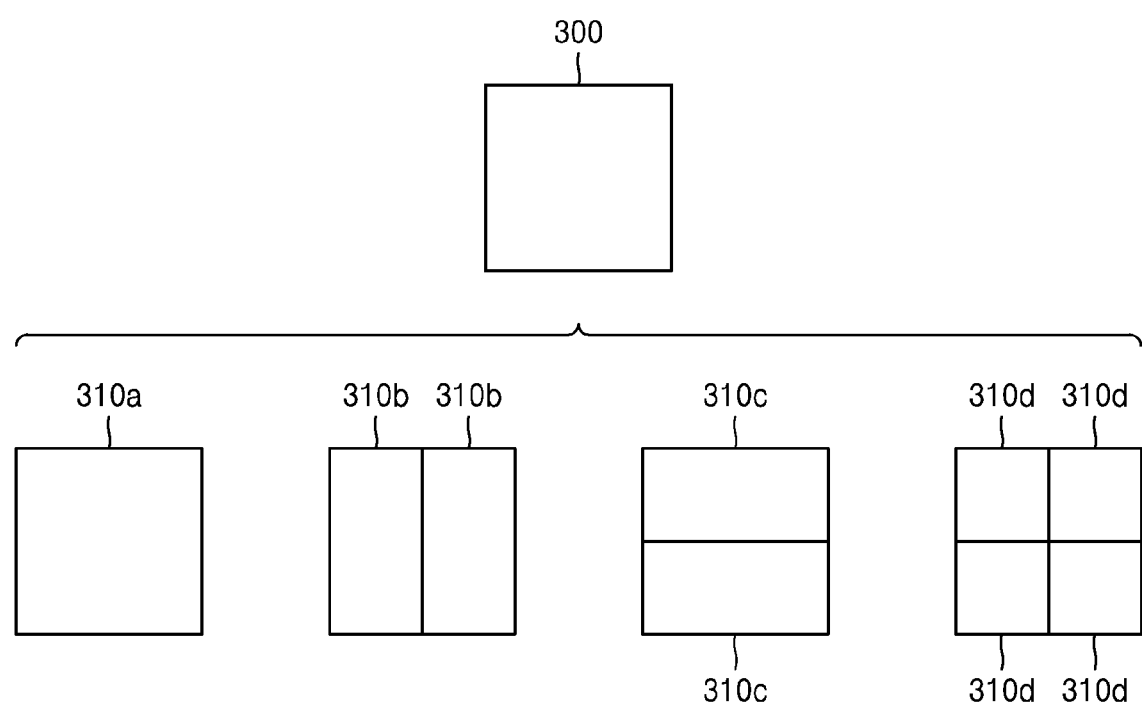
FIG. 3 illustrates a process of determining at least one coding unit when a current coding unit is split, according to an embodiment.

FIG. 3 illustrates a process of determining at least one coding unit when the image decoding apparatus 100 splits a current coding unit, according to an embodiment.

According to an embodiment, the decoder 120 may determine, by using the block shape information, a shape of a coding unit, or may determine, by using the split shape information, a shape according to which the coding unit is to be split. In other words, a method of splitting a coding unit, which is indicated by the split shape information, may be determined based on which block shape is indicated by the block shape information used by the decoder 120.

According to an embodiment, the decoder 120 may use the block shape information indicating that a current coding unit has a square shape. For example, the decoder 120 may determine whether to split a square coding unit or not, whether to split the square coding unit vertically, whether to split the square coding unit horizontally, or whether to split the square coding unit into four coding units, according to the split shape information. Referring to FIG. 3, when block shape information of a current coding unit 300 indicates a square shape, the decoder 120 may not split a coding unit 310*a* having the same size as the current coding unit 300 according to split shape information indicating no split, or may determine coding units 310*b* through 310*d* split based on split shape information indicating a predetermined split method.

Referring to FIG. 3, the decoder 120 may determine the two coding units 310*b* obtained by splitting the current coding unit 300 in a vertical direction based on split shape information indicating split in a vertical direction, according to an embodiment. The decoder 120 may determine the two coding units 310*c* obtained by splitting the current coding unit 300 in a horizontal direction based on split shape information indicating split in a horizontal direction. The decoder 120 may determine the four coding units 310*d* obtained by splitting the current coding unit 300 in vertical and horizontal directions based on split shape information indicating split in vertical and horizontal directions. However, a split shape for splitting a square coding unit may not be limitedly interpreted to above shapes, and may include various shapes indicatable by split shape information. Predetermined split shapes for splitting a square coding unit will be described in detail below through various embodiments.

Figure 4:
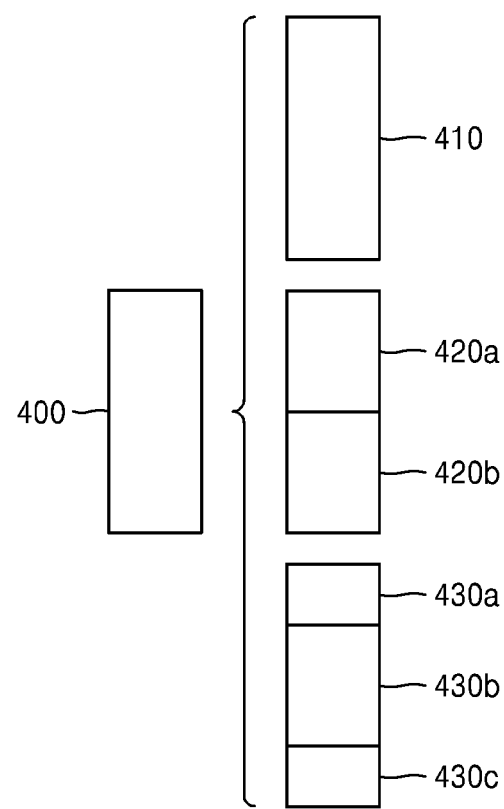
FIG. 4 illustrates a process of determining at least one coding unit when a coding unit having a non-square shape is split, according to an embodiment.
Figure 4:
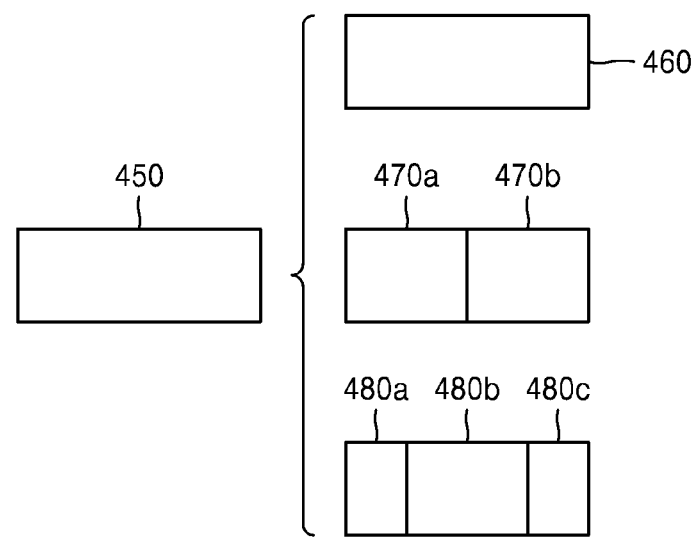

FIG. 4 illustrates a process of determining at least one coding unit when the image decoding apparatus 100 splits a coding unit having non-square shape, according to an embodiment.

According to an embodiment, the decoder 120 may use block shape information indicating that a current coding unit has a non-square shape. The decoder 120 may determine whether not to split the current coding unit having the non-square shape, or whether to split the current coding unit having the non-square shape using a predetermined method. Referring to FIG. 4, when block shape information of a current coding unit 400 or 450 indicates a non-square shape, the decoder 120 may not split a coding unit 410 or 460 having the same size as the current coding unit 400 or 450 according to split shape information indicating no split, or may determine coding units 420*a* 420*b*, 430*a*, 430*b*, 430*c*, 470*a*, 470*b*, 480*a*, 480*b*, and 480*c* split according to split shape information indicating a predetermined split method. A predetermined split method of splitting a non-square coding unit will be described in detail later through various embodiments.

According to an embodiment, the decoder 120 may determine, by using the split shape information, a shape of a coding unit is split, and in this case, the split shape information may indicate the number of at least one coding unit generated when a coding unit is split. Referring to FIG. 4, when the split shape information indicates that the current coding unit 400 or 450 is split into two coding units, the decoder 120 may determine the two coding units 420*a* and 420*b* or 470*a* and 470*b*, which are respectively included in the current coding unit 400 or 450 by splitting the current coding unit 400 or 450 based on the split shape information.

According to an embodiment, when the decoder 120 splits the current coding unit 400 or 450 having the non-square shape based on the split shape information, the decoder 120 may split the current coding unit 400 or 450 having the non-square shape in consideration of a location of a longer side. For example, the decoder 120 may determine a plurality of coding units by splitting the current coding unit 400 or 450 in a direction of splitting the longer sides of the current coding unit 400 or 450 in consideration of the shape of the current coding unit 400 or 450.

According to an embodiment, when split shape information indicates that a coding unit is split into an odd number of blocks, the decoder 120 may determine an odd number of coding units included in the current coding unit 400 or 450. For example, when split shape information indicates that the current coding unit 400 or 450 is split into three coding units, the decoder 120 may split the current coding unit 400 or 450 into the three coding units 430*a* through 430*c* or 480*a* through 480*c*. According to an embodiment, the decoder 120 may determine the odd number of coding units included in the current coding unit 400 or 450, wherein sizes of the determined coding units are not the same. For example, a size of the coding unit 430*b* or 480*b* from among the odd number of coding units 430*a* through 430*c* or 480*a* through 480*c* may be different from sizes of the coding units 430*a* and 430*c* or 480*a* or 480*c*. In other words, coding units that may be determined when the current coding unit 400 or 450 is split may have different types of sizes, and in some cases, the odd number of coding units 430a through 430c and 480a through 480c may have different sizes.

According to an embodiment, when split shape information indicates that a coding unit is split into an odd number of blocks, the decoder 120 may determine an odd number of coding units included in the current coding unit 400 or 450 and in addition, set a predetermined limit on at least one coding unit from among the odd number of coding units generated by splitting the current coding unit 400 or 450. Referring to FIG. 4, the decoder 120 may decode the coding unit 430b or 480b at the center of the three coding units 430a through 430c or 480a through 480c generated when the current coding unit 400 or 450 is split in a different manner from the coding units 430a and 430c or 480a and 480c. For example, the decoder 120 may limit the coding unit 430b or 480b at the center not to be further split unlike the coding units 430a and 430c or 480a and 480c, or to be split only a certain number of times.

Figure 5:
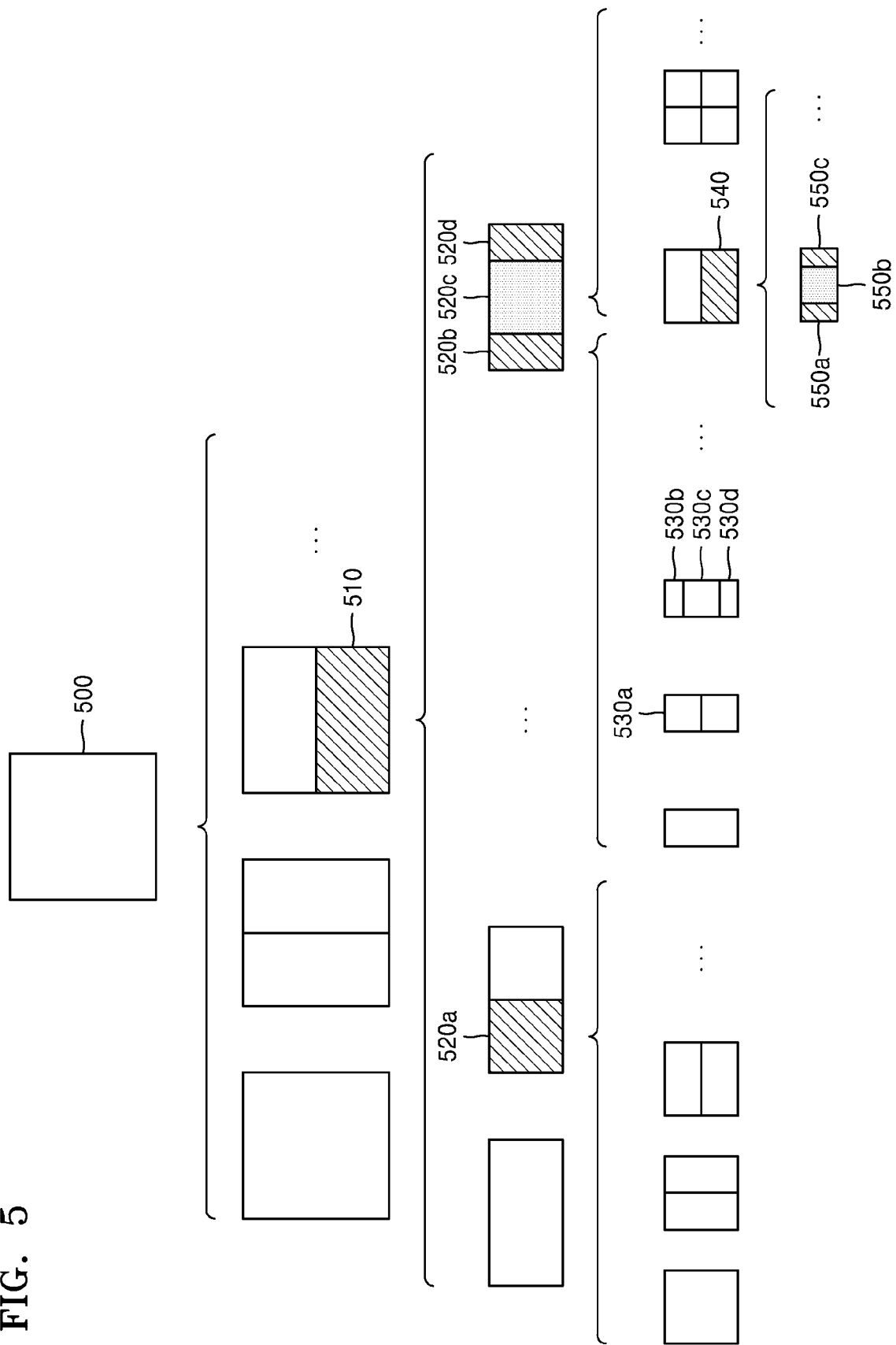
FIG. 5 illustrates a process of splitting a coding unit based on at least one of block shape information and split shape information, according to an embodiment.

FIG. 5 illustrates a process of splitting, by the image decoding apparatus 100, a coding unit based on at least one of block shape information and split shape information, according to an embodiment.

According to an embodiment, the decoder 120 may determine whether to split a first coding unit 500 having a square shape into coding units based on at least one of block shape information and split shape information. According to an embodiment, when the split shape information indicates splitting of the first coding unit 500 in a horizontal direction, the decoder 120 may determine a second coding unit 510 by splitting the first coding unit 500 in the horizontal direction. The terms "first coding unit", "second coding unit", and "third coding unit" according to an embodiment are used in the context of splitting a coding unit. For example, a second coding unit may be determined when a first coding unit is split and a third coding unit may be determined when the second coding unit is split. Relationships between the first through third coding units used hereinafter may be understood to follow the above order characteristics.

According to an embodiment, the image decoding apparatus 100 may determine whether to split the determined second coding unit 510 into coding units based on at least one of block shape information and split shape information. Referring to FIG. 5, the decoder 120 may split the second coding unit 510, which has a non-square shape determined by splitting the first coding unit 500, into at least one third coding unit, for example, third coding units 520a through 520d, based on at least one of block shape information and split shape information, or may not split the second coding unit 510. The bitstream obtainer 110 of the image decoding apparatus 100 may obtain at least one of block shape information and split shape information, the decoder 120 may split the first coding unit 500 based on at least one of the block shape information and the split shape information to obtain a plurality of second coding units (for example, the second coding unit 510) having various shapes, and the second coding unit 510 may be split according to a manner of splitting the first coding unit 500 based on at least one of the block shape information and the split shape information.

According to an embodiment, when the first coding unit 500 is split into the second coding units 510 based on at least one of block shape information and split shape information about the first coding unit 500, the second coding unit 510 may also be split into the third coding units, for example, the third coding units 520a through 520d, based on at least one of block shape information and split shape information about the second coding unit 510. In other words, a coding unit may be recursively split based on at least one of split shape information and block shape information related to the coding unit. Accordingly, a square coding unit may be determined from a non-square coding unit, and such a square coding unit may be recursively split to determine a non-square coding unit. Referring to FIG. 5, a predetermined coding unit (for example, a coding unit located at the center or a coding unit having a square shape) from among the odd number of third coding units 520b through 520d that are determined when the second coding unit 510 having a non-square shape is split may be recursively split. According to an embodiment, the square third coding unit 520c that is one of the odd number of third coding units 520b through 520d may be split in a horizontal direction to be split into a plurality of fourth coding units. A non-square fourth coding unit 540 that is one of the plurality of fourth coding units may be split into a plurality of coding units again. For example, the non-square fourth coding unit 540 may be split into an odd number of coding units 550a through 550c again.

A method used to recursively split a coding unit will be described below through various embodiments.

According to an embodiment, the decoder 120 may determine to split each of the third coding units (for example, the third coding units 520a through 520d) into coding units or not to split the second coding unit 510 based on at least one of block shape information and split shape information. The decoder 120 may split the second coding unit 510 having a non-square shape into the odd number of third coding units 520b through 520d, according to an embodiment. The image decoding apparatus 100 may set a predetermined limitation on a predetermined third coding unit from among the odd number of third coding units 520b through 520d. For example, the image decoding apparatus 100 may limit the coding unit 520c located at the center from among the odd number of third coding units 520b through 520d to be split no more or to be split to a settable number of times. Referring to FIG. 5, the image decoding apparatus 100 may limit the coding unit 520c located at the center from among the odd number of third coding units 520b through 520d included in the second coding unit 510 having a non-square shape to be split no more, to be split into a predetermined split manner (for example, split only into four coding units or split into a shape corresponding to that into which the second coding unit 510 is split), or to be split only a predetermined number of times (for example, split only n times, wherein n>0). However, the limitations on the coding unit 520c located at the center are simply embodiments, and thus the present invention should not be interpreted limitedly to the above embodiments, and it should be interpreted that the limitations include various limitations of decoding the coding unit 520c located at the center differently from the coding units 520b and 520d.

According to an embodiment, the image decoding apparatus 100 may obtain, from a predetermined location in a current coding unit, at least one of block shape information and split shape information used to split the current coding unit.

Figure 6:
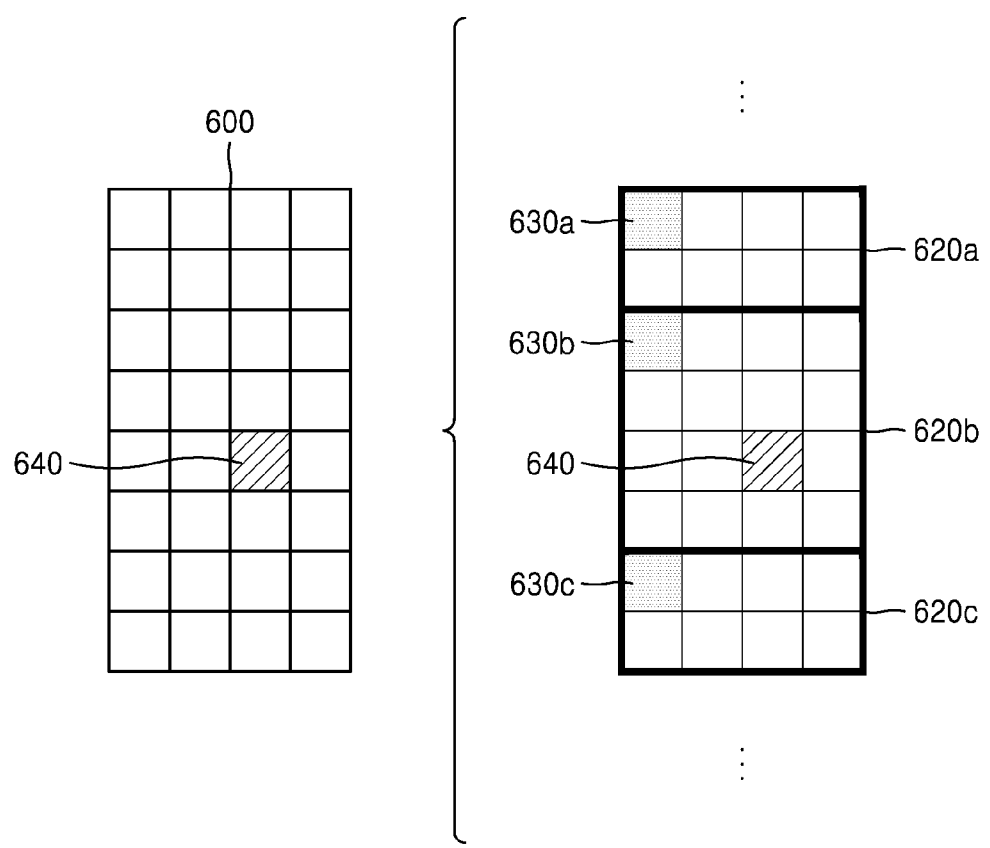
FIG. 6 illustrates a method of determining a predetermined coding unit from among an odd number of coding units, according to an embodiment.

FIG. 6 illustrates a method of determining, by the decoder 120, a predetermined coding unit from among an odd number of coding units, according to an embodiment. Referring to FIG. 6, at least one of block shape information and split shape information of a current coding unit 600 may be obtained from a sample at a predetermined location (for example, a sample 640 located at the center) from among a plurality of samples included in the current coding unit 600. However, the predetermined location in the current coding unit 600 for obtaining at least one of the block shape information and the split shape information should not be limitedly interpreted to the center in FIG. 6, but should be interpreted to include various locations (for example, uppermost, lowermost, left, right, upper left, lower left, upper right, and lower right locations) in the current coding unit 600. The image decoding apparatus 100 may obtain at least one of the block shape information and the split shape information from the predetermined location to determine to split or not to split the current coding unit into coding units having various shapes and sizes.

According to an embodiment, when the current coding unit is split into a predetermined number of coding units, the image decoding apparatus 100 may select one of the coding units. A method of selecting one of a plurality of coding units may vary, and descriptions about such a method will be described below through various embodiments.

According to an embodiment, the decoder 120 of the image decoding apparatus 100 may split the current coding unit into the plurality of coding units, and determine the coding unit at the predetermined location.

FIG. 6 illustrates a method of determining, by the image decoding apparatus 100, a coding unit at a predetermined location from among an odd number of coding units, according to an embodiment.

According to an embodiment, the decoder 120 may use information indicating a location of each of an odd number of coding units so as to determine a coding unit located at the center of the odd number of coding units. Referring to FIG. 6, the decoder 120 may determine an odd number of coding units 620a through 620c by splitting the current coding unit 600. The decoder 120 may determine the coding unit 620b at the center by using information about locations of the odd number of coding units 620a through 620c. For example, the decoder 120 may determine the coding unit 620 located at the center by determining locations of the coding units 620a through 620c based on information indicating locations of predetermined samples included in the coding units 620a through 620c. In detail, the decoder 120 may determine the coding unit 620b located at the center by determining the locations of the coding units 620a through 620c based on information indicating locations of upper left samples 630a through 630c of the coding units 620a trough 620c.

According to an embodiment, the information indicating the locations of the upper left samples 630a through 630c respectively included in the coding units 620a through 620c may include information about locations or coordinates in a picture of the coding units 620a through 620c. According to an embodiment, the information indicating the locations of the upper left samples 630a through 630c respectively included in the coding units 620a through 620c may include information indicating widths or heights of the coding nits 620a through 620c included in the current coding unit 600, wherein the widths or heights may correspond to information indicating differences between coordinates in the picture of the coding units 620a through 620c. In other words, the image decoding apparatus 100 may determine the coding unit 620b located at the center by directly using the information about the locations or coordinates in the picture of the coding units 620a through 620c, or by using the information about the widths or heights of the coding units, which indicate difference values between coordinates.

According to an embodiment, the information indicating the location of the upper left sample 630a of the top coding unit 620a may indicate (xa, ya) coordinates, information indicating the location of the upper left sample 630b of the center coding unit 620b may indicate (xb, yb) coordinates, and the information indicating the location of the upper left sample 630c of the bottom coding unit 620c may indicate (xc, yc) coordinates. The image decoding apparatus 100 may determine the center coding unit 620b by using the coordinates of the upper left samples 630a through 630c respectively included in the coding units 620a through 620c. For example, when the coordinates of the upper left samples 630a through 630c are aligned in an ascending order or descending order, the center coding unit 620b including (xb, yb) that is coordinates of the upper left sample 630b may be determined as a coding unit located at the center from among the coding units 620a through 620c determined when the current coding unit 600 is split. Here, the coordinates indicating the locations of the upper left samples 630a through 630c may indicate coordinates indicating absolute locations in the picture, and further, may use (dxb, dyb) coordinates that are information indicating a relative location of the upper left sample 630b of the center coding unit 620b and (dxc, dyc) coordinates that are information indicating a relative location of the upper left sample 630c of the bottom coding unit 620c, based on the location of the upper left sample 630c of the top coding unit 620a. Also, a method of determining a coding unit at a predetermined location by using coordinates of a sample included in a coding unit as information indicating a location of the sample should not be limitedly interpreted to the above method, and may be interpreted to various arithmetic methods capable of using coordinates of a sample.

According to an embodiment, the image decoding apparatus 100 may split the current coding unit 600 into the plurality of coding units 620a through 620c, and select a coding unit from among the coding units 620a through 620c according to a predetermined criterion. For example, the decoder 120 may select the coding unit 620b that has a different size from among the coding units 620a through 620c.

According to an embodiment, the image decoding apparatus 100 may determine the width or height of each of the coding units 620a through 620c by using the (xa, ya) coordinates that are the information indicating the location of the upper left sample 630a of the top coding unit 620a, the (xb, yb) coordinates that are the information indicating the location of the upper left sample 630b of the center coding unit 620b, and the (xc, yc) coordinates that are the information indicating the location of the upper left sample 630c of the bottom coding unit 620c. The image decoding apparatus 100 may determine a size of each of the coding units 620a through 620c by using the coordinates (xa, ya), (xb, yb), and (xc, yc) indicating the locations of the coding units 620a through 620c.

According to an embodiment, the image decoding apparatus 100 may determine the width of the top coding unit 620a to xb-xa and the height to yb-ya. According to an embodiment, the decoder 120 may determine the width of the center coding unit 620b to xc-xb and the height to yc-yb. According to an embodiment, the decoder 120 may determine the width or height of the bottom coding unit by using the width or height of the current coding unit, and the width and height of the top coding unit 620a and the center coding unit 620b. The decoder 120 may determine one coding unit having a size different from other coding units based on the determined widths and heights of the coding units 620a through 620c. Referring to FIG. 6, the image decoding apparatus 100 may determine, as the coding unit at the predetermined location, the center coding unit 620b having a size different from sizes of the top coding unit 620a and the bottom coding unit 620c. However, since a process of determining, by the image decoding apparatus 100, a coding unit having a size different from other coding units is only an embodiment of determining a coding unit at a predetermined location by using sizes of coding units determined based on sample coordinates, various processes of determining a coding unit at a predetermined location by comparing sizes of coding units determined according to predetermined sample coordinates may be used.

However, a location of a sample considered to determine a location of a coding unit should not be limitedly interpreted to the upper left, but may be interpreted that information about a location of an arbitrary sample included in a coding unit is usable.

According to an embodiment, the image decoding apparatus 100 may select a coding unit at a predetermined location from among an odd number of coding units that are determined when a current coding unit is split, in consideration of a shape of the current coding unit. For example, when the current coding unit has a non-square shape in which a width is longer than a height, the decoder 120 may determine the coding unit at the predetermined location along a horizontal direction. In other words, the decoder 120 may determine a coding unit from among coding units having different locations in the horizontal direction, and set a limitation on the coding unit. When the current coding unit has the non-square shape in which the height is longer than the width, the decoder 120 may determine the coding unit at the predetermined location along a vertical direction. In other words, the decoder 120 may determine a coding unit from among coding units having different locations in the vertical direction, and set a limitation on the coding unit.

According to an embodiment, the image decoding apparatus 100 may use information indicating a location of each of an even number of coding units in order to determine a coding unit at a predetermined location from among the even number of coding units. The decoder 120 may determine the even number of coding units by splitting a current coding unit, and determine the coding unit at the predetermined location by using the information about the locations of the even number of coding units. Detailed processes thereof may be similar to processes of determining a coding unit at a predetermined location (for example, a center location) from among an odd number of coding units, which have been described above with reference to FIG. 6, and thus descriptions thereof are not provided again.

According to an embodiment, when a current coding unit having a non-square shape is split into a plurality of coding units, predetermined information about a coding unit at a predetermined location may be used during a split process in order to determine the coding unit at the predetermined location from among the plurality of coding units. For example, the decoder 120 of the image decoding apparatus 100 may use at least one of block shape information and split shape information, which are stored in a sample included in a center coding unit during a split process in order to determine a coding unit located at the center from among a plurality of coding units obtained by splitting a current coding unit.

Referring to FIG. 6, the decoder 120 of the image decoding apparatus 100 may split the current coding unit 600 into the plurality of coding units 620a through 620c based on at least one of block shape information and split shape information, and determine the coding unit 620b located at the center from among the plurality of coding units 620a through 620c. In addition, the decoder 120 may determine the coding unit 620b located at the center in consideration of a location where at least one of the block shape information and the split shape information is obtained. In other words, at least one of the block shape information and the split shape information of the current coding unit 600 may be obtained from the sample 640 located at the center of the current coding unit 600, and when the current coding unit 600 is split into the plurality of coding units 620a through 620c based on at least one of the block shape information and the split shape information, the coding unit 620b including the sample 640 may be determined as the coding unit located at the center. However, information used to determine a coding unit located at the center should not be limitedly interpreted to at least one of block shape information and split shape information, and various types of information may be used during a process of determining a coding unit located at the center.

According to an embodiment, predetermined information for identifying a coding unit at a predetermined location may be obtained from a predetermined sample included in a coding unit to be determined. Referring to FIG. 6, the decoder 120 may use at least one of block shape information and split shape information obtained from a sample located at a predetermined location in the current coding unit 600 (for example, a sample located at the center of the current coding unit 600) in order to determine a coding unit at a predetermined location from among the plurality of coding units 620a through 620c determined when the current coding unit 600 is split (for example, a coding unit located at the center from among the plurality of coding units). In other words, the decoder 120 may determine the sample at the predetermined location in consideration of a block shape of the current coding unit 600, and the decoder 120 may determine and set a predetermined limitation on the coding unit 620b including the sample from which predetermined location (for example, at least one of the block shape information and the split shape information) is obtained, from among the plurality of coding units 620a through 620c determined when the current coding unit 600 is split. Referring to FIG. 6, according to an embodiment, the decoder 120 may determine the sample 640 located at the center of the current coding unit 600, as the sample from which the predetermined information is obtained, and the decoder 120 may set the predetermined location during a decoding process, on the coding unit 620b including the sample 640. However, a location of a sample from which predetermined information is obtained should not be limitedly interpreted to the above location, and the sample may be interpreted to samples at arbitrary locations included in the coding unit 620 determined to be limited.

According to an embodiment, a location of a sample from which predetermined location is obtained may be determined based on a shape of the current coding unit 600. According to an embodiment, block shape information may be used to determine whether a shape of a current coding unit is a square or a non-square, and a location of a sample from which predetermined information is obtained may be determined based on the shape. For example, the decoder 120 may determine, as a sample from which predetermined information is obtained, a sample located on a boundary of splitting at least one of a width and a height of a current coding unit into halves by using at least one of information about the width of the current coding unit and information about the height of the current coding unit. As another example, when block shape information about a current coding unit indicates a non-square shape, the decoder 120 may determine, as a sample from which predetermined information is obtained, one of samples adjacent to a boundary of splitting a longer side of the current coding unit into halves.

According to an embodiment, when a current coding unit is split into a plurality of coding units, the image decoding apparatus 100 may use at least one of block shape information and split shape information in order to determine a coding unit at a predetermined location from among the plurality of coding units. According to an embodiment, the bitstream obtainer 110 may obtain at least one of the block shape information and the split shape information from a sample at a predetermined location included in the coding unit, and the decoder 120 may split the plurality of coding units generated when the current coding unit is split by using at least one of the split shape information and the block shape information obtained from the sample at the predetermined location included in each of the plurality of coding units. In other words, the coding unit may be recursively split by using at least one of the block shape information and the split shape information obtained from the sample at the predetermined location in each coding unit. Since a recursive split process of a coding unit has been described above with reference to FIG. 5, details thereof are not provided again.

According to an embodiment, the image decoding apparatus 100 may determine at least one coding unit by splitting a current coding unit, and determine an order of decoding the at least one coding unit according to a predetermined block (for example, a current coding unit).

Figure 7:
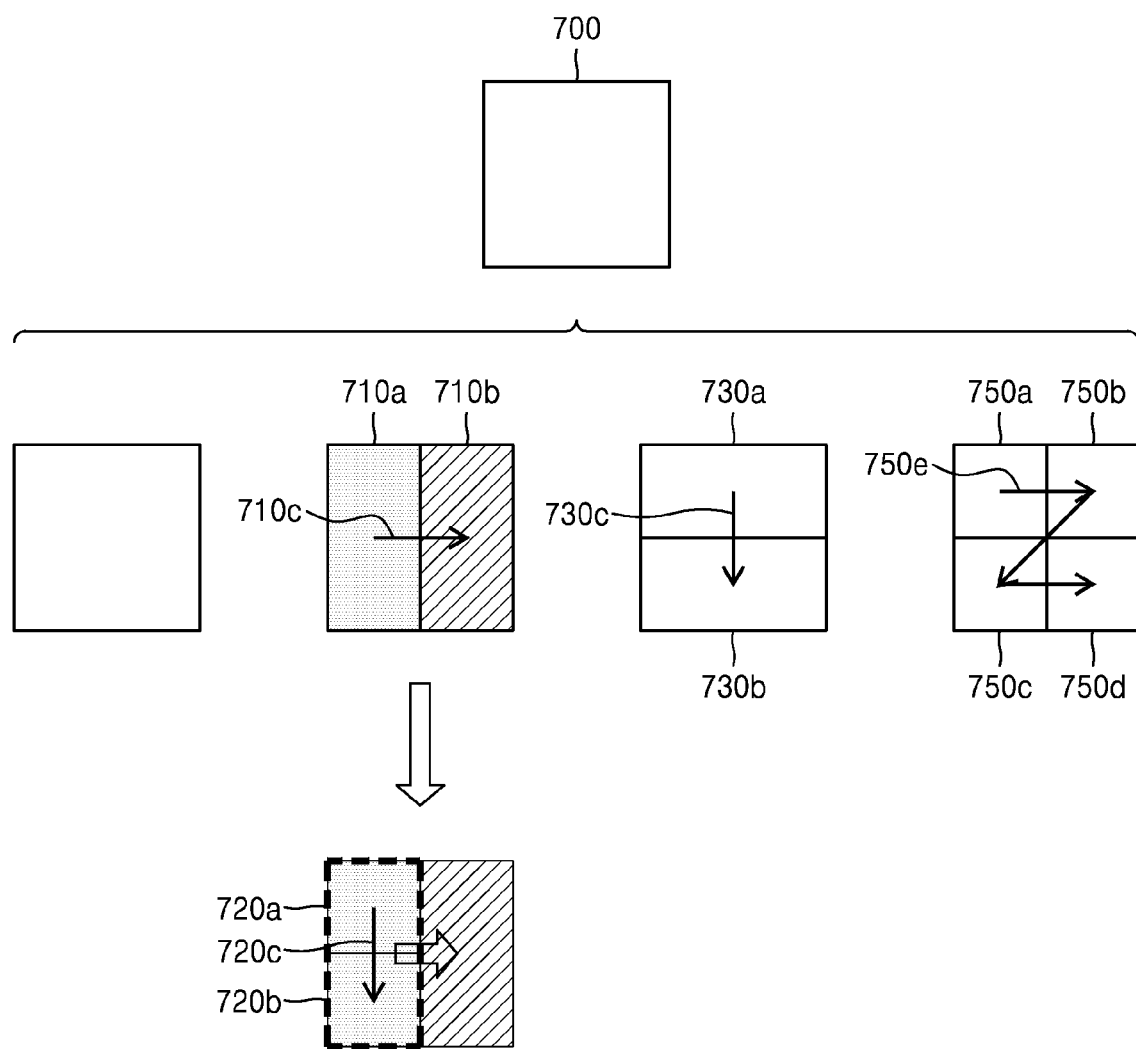
FIG. 7 illustrates an order of processing a plurality of coding units when the plurality of coding units are determined when a current coding unit is split, according to an embodiment.

FIG. 7 illustrates an order of processing a plurality of coding units when the image decoding apparatus 100 determines the plurality of coding units by splitting a current coding unit, according to an embodiment.

According to an embodiment, the decoder 120 may determine, according to block shape information and split shape information, second coding units 710a and 710b by splitting a first coding unit 700 in a vertical direction, second coding units 730a and 730b by splitting the first coding unit 700 in a horizontal direction, or second coding units 750a through 750d by splitting the first coding unit 700 in vertical and horizontal directions.

Referring to FIG. 7, the decoder 120 may determine an order such that the second coding units 710a and 710b determined by splitting the first coding unit 700 in the vertical direction to be processed in a horizontal direction 710c. The image decoding apparatus 100 may determine a processing order of the second coding units 730a and 730b determined by splitting the first coding unit 700 in the horizontal direction to be in a vertical direction 730c. The image decoding apparatus 100 may determine the second coding units 750a through 750d determined by splitting the first coding unit 700 in the vertical and horizontal directions to be processed according to a predetermined order (for example, a raster scan order or a z-scan order 750e) in which coding units in one row are processed and then coding units in a next row are processed.

According to an embodiment, the image decoding apparatus 100 may recursively split coding units. Referring to FIG. 7, the decoder 120 may determine a plurality of coding units 710a, 710b, 730a, 730b, 750a, 750b, 750c, and 750d by splitting the first coding unit 700, and recursively split each of the determined plurality of coding units 710a, 710b, 730a, 730b, 750a, 750b, 750c, and 750d. A method of splitting the plurality of coding units 710a, 710b, 730a, 730b, 750a, 750b, 750c, and 750d may be similar to a method of splitting the first coding unit 700. Accordingly, the plurality of coding units 710a, 710b, 730a, 730b, 750a, 750b, 750c, and 750d may each be independently split into a plurality of coding units. Referring to FIG. 7, the decoder 120 may determine the second coding units 710a and 710b by splitting the first coding unit 700 in the vertical direction, and in addition, may determine to split or not to split each of the second coding units 710a and 710b independently.

According to an embodiment, the decoder 120 may split the left second coding unit 710a in the horizontal direction to obtain third coding units 720a and 720b, and may not split the right second coding unit 710b.

According to an embodiment, a processing order of coding units may be determined based on a split process of coding units. In other words, a processing order of split coding units may be determined based on a processing order of coding units before being split. The decoder 120 may determine an order of processing the third coding units 720a and 720b determined when the left second coding unit 710a is split independently from the right second coding unit 710b. Since the third coding units 720a and 720b are determined when the left second coding unit 710a is split in the horizontal direction, the third coding units 720a and 720b may be processed in a vertical direction 720c. Also, since the order of processing the left second coding unit 710a and the right second coding unit 710b is in the horizontal direction 710c, the third coding units 720a and 720b included in the left second coding unit 710a may be processed in the vertical direction 720c and then the right second coding unit 710b may be processed. Since the above description is for describing a process of determining a processing order according to coding units before being split, the process should not be limitedly interpreted to the above embodiments, and various methods of independently processing coding units split and determined in various shapes according to a predetermined order may be used.

Figure 8:
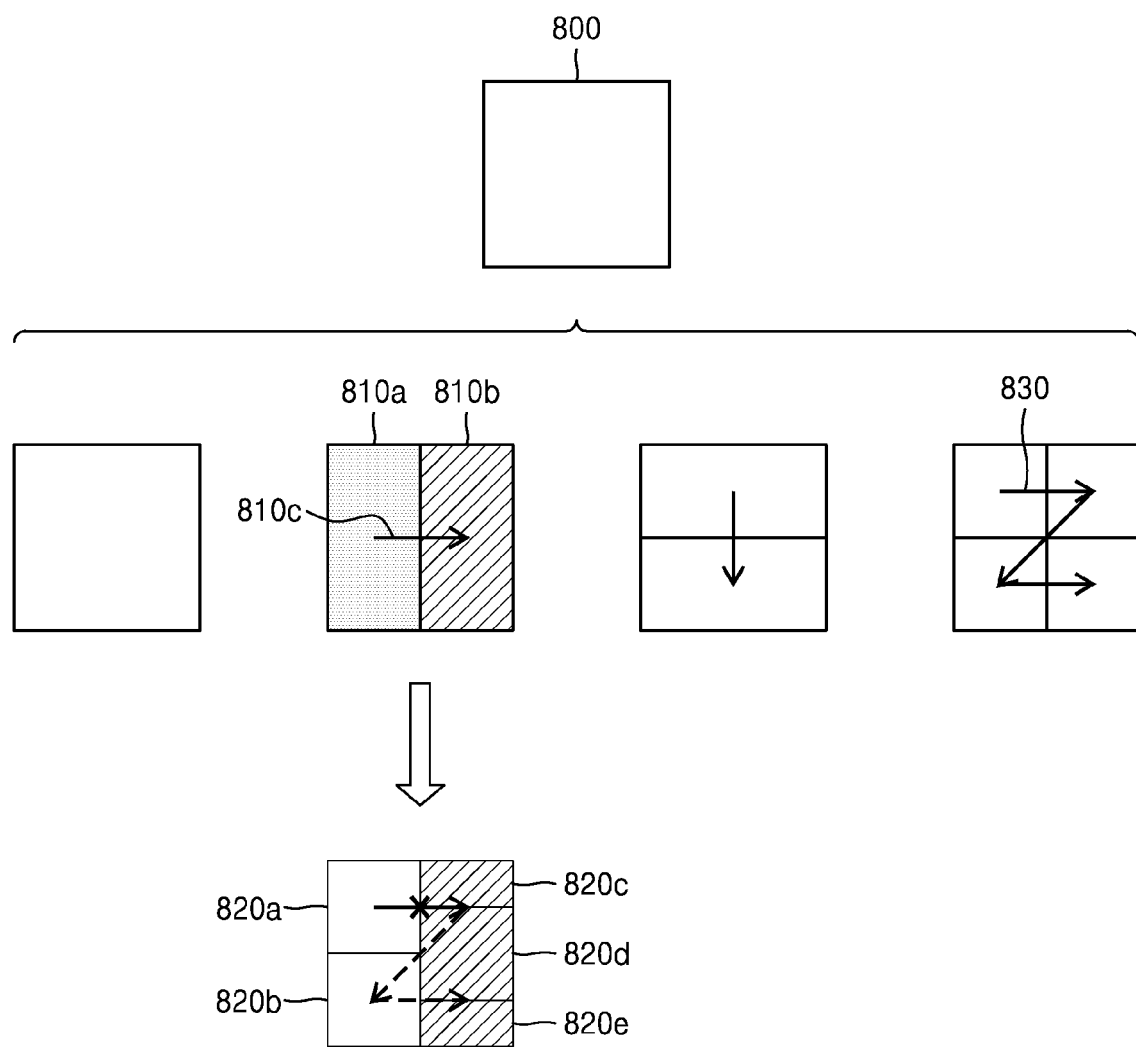
FIG. 8 illustrates a process of determining that a current coding unit is split into an odd number of coding units when coding units are unable to be processed in a predetermined order, according to an embodiment.

FIG. 8 illustrates a process of determining, by the image decoding apparatus 100, that a current coding unit is split into an odd number of coding units when coding units are unable to be processed in a predetermined order, according to an embodiment.

According to an embodiment, the image decoding apparatus 100 may determine that the current coding unit is split into the odd number of coding units based on block shape information and split shape information obtained by the bitstream obtainer 110. Referring to FIG. 8, a first coding unit 800 having a square shape may be split into second coding units 810a and 810b having non-square shapes, and the second coding units 810a and 810b may be independently split into third coding units 820a through 820e. According to an embodiment, the decoder 120 may determine a plurality of the third coding units 820a and 820b by splitting the left coding unit 810a from among the second coding units in a horizontal direction, and the right coding unit 810b may be split into an odd number of the third coding units 820c through 820e.

According to an embodiment, the decoder 120 may determine whether a coding unit split into an odd number exists by determining whether the third coding units 820a through 820e are processable in a predetermined order. Referring to FIG. 8, the decoder 120 may determine the third coding units 820a through 820e by recursively splitting the first coding unit 800. The decoder 120 may determine, based on at least one of block shape information and split shape information, whether there is a coding unit split into an odd number from among the first coding unit 800, the second coding units 810a and 810b, and the third coding units 820a through 820e. For example, a coding unit located at the right from among the second coding units 810a and 810b may be split into the odd number of third coding units 820c through 820e. An order of processing a plurality of coding units included in the first coding unit 800 may be a predetermined order 830 (for example, a z-scan order), and the decoder 120 may determine whether the third coding units 820c through 820e determined when the right second coding unit 810b is split into an odd number satisfy a condition of being processable according to the predetermined order.

According to an embodiment, the image decoding apparatus 100 may determine whether the third coding units 820a through 820e included in the first coding unit 800 satisfy a condition of being processable according to a predetermined order, wherein the condition is related to whether at least one of a width and a height of the second coding units 810a and 810b is split into halves along boundaries of the third coding units 820a through 820e. For example, the third coding units 820a and 820b that are determined when the left second coding unit 810a having a non-square shape is split into halves satisfy the condition, but the third coding units 820c through 820e do not satisfy the condition since the boundaries of the third coding units 820c through 820e that are determined when the right second coding unit 810b is split into three coding units are unable to split a width or height of the right second coding unit 810b into halves. Also, the image decoding apparatus 100 may determine disconnection of a scan order when the condition is dissatisfied, and determine that the right second coding unit 810b is split into an odd number of coding units based on the determination result. According to an embodiment, when a coding unit is split into an odd number of coding units, the image decoding apparatus 100 may set a predetermined limitation on a coding unit at a predetermined location from among the coding units, and since details about the limitation or the predetermined location have been described above through various embodiments, details thereof are not provided again.

Figure 9:
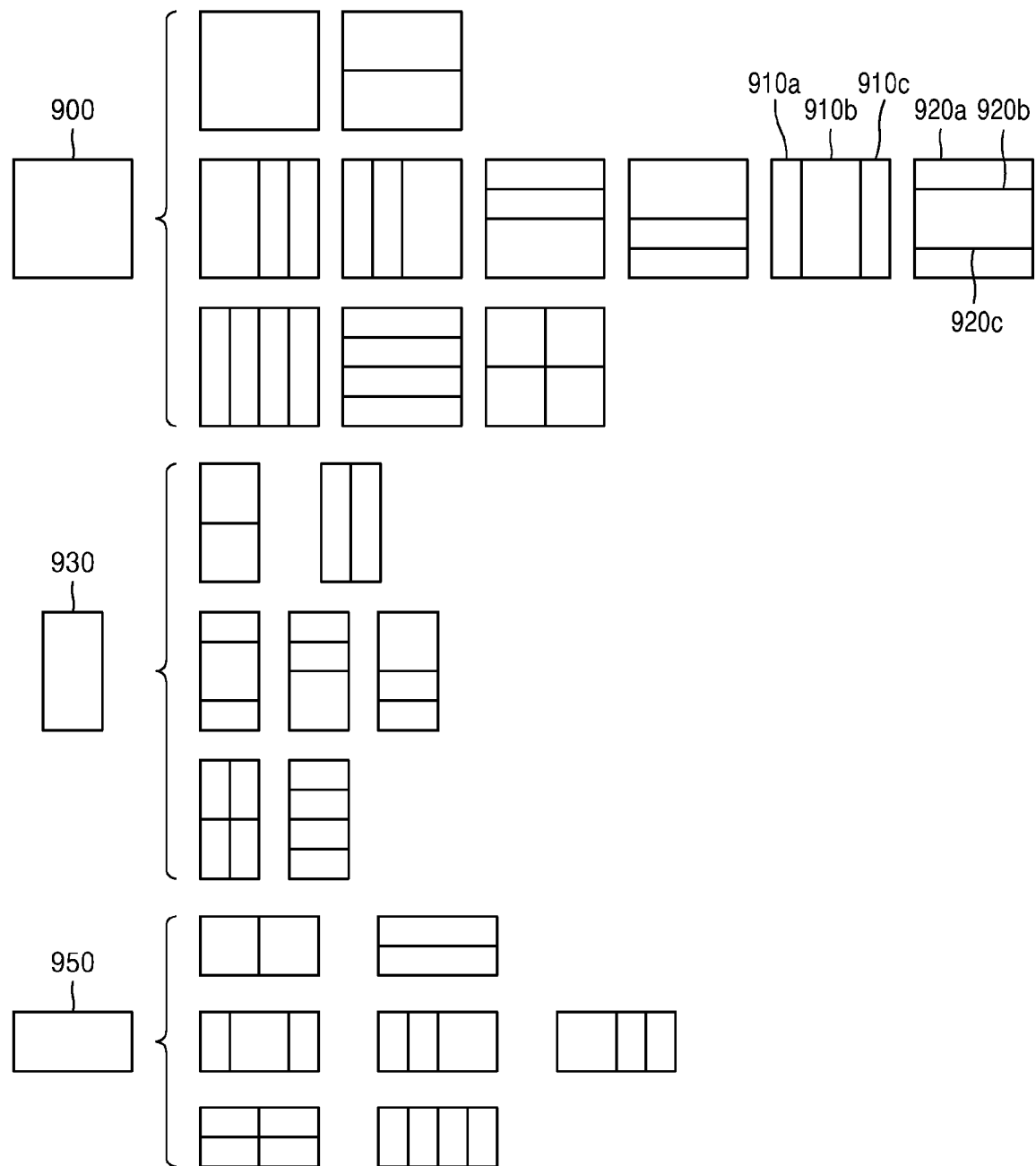
FIG. 9 illustrates a process of determining at least one coding unit when a first coding unit is split, according to an embodiment.

FIG. 9 illustrates a process of determining, by the image decoding apparatus 100, at least one coding unit when a first coding unit 900 is split, according to an embodiment. According to an embodiment, the decoder 120 may split the first coding unit 900 based on at least one of block shape information and split shape information obtained through the bitstream obtainer 110. The first coding unit 900 having a square shape may be split into four coding units having square shapes or non-square shapes. For example, referring to FIG. 9, when block shape information indicates that the first coding unit 900 is a square and split shape information indicates that the first coding unit 900 is split into non-square coding units, the decoder 120 may split the first coding unit 900 into a plurality of non-square coding units. In detail, when the split shape information indicates that the first coding unit 900 is split into a horizontal or vertical direction to determine an odd number of coding units, the decoder 120 may split the first coding unit 900 having a square shape into, as the odd number of coding units, second coding units 910a through 910c determined when the first coding unit 900 is split in the vertical direction, or second coding units 920a through 920c determined when the first coding unit 900 is split in the horizontal direction.

According to an embodiment, the decoder 120 may determine whether the second coding units 910a through 910c and 920a through 920c included in the first coding unit 900 satisfy a condition of being processable according to a predetermined order, wherein the condition is related to whether at least one of the width and the height of the first coding unit 900 is split into halves along the boundaries of the second coding units 910a through 910c and 920a through 920c. Referring to FIG. 9, since the boundaries of the second coding units 910a through 910c determined when the first coding unit 900 having a square shape is split in the vertical direction are unable to split the width of the first coding unit 900 into halves, it may be determined that the first coding unit 900 does not satisfy the condition of being processable according to the predetermined order. Also, since the boundaries of the second coding units 920a through 920c determined when the first coding unit 900 having a square shape is split in the horizontal direction are unable to split the width of the first coding unit 900 into halves, it may be determined that the first coding unit 900 does not satisfy the condition of being processable according to the predetermined order. When the condition is dissatisfied, the image decoding apparatus 100 determines disconnection of a scan order and may determine that the first coding unit 900 is split into an odd number of coding units based on the determination result. According to an embodiment, when a coding unit is split into an odd number of coding units, the image decoding apparatus 100 may set a predetermined limitation on a coding unit at a predetermined location from among the coding units, and since details about the limitation or the predetermined location have been described above through various embodiments, details thereof are not provided again.

According to an embodiment, the image decoding apparatus 100 may determine coding units having various shapes by splitting a first coding unit.

Referring to FIG. 9, the image decoding apparatus 100 may split the first coding unit 900 having a square shape and a first coding unit 930 or 950 having a non-square shape into coding units having various shapes.

Figure 10:
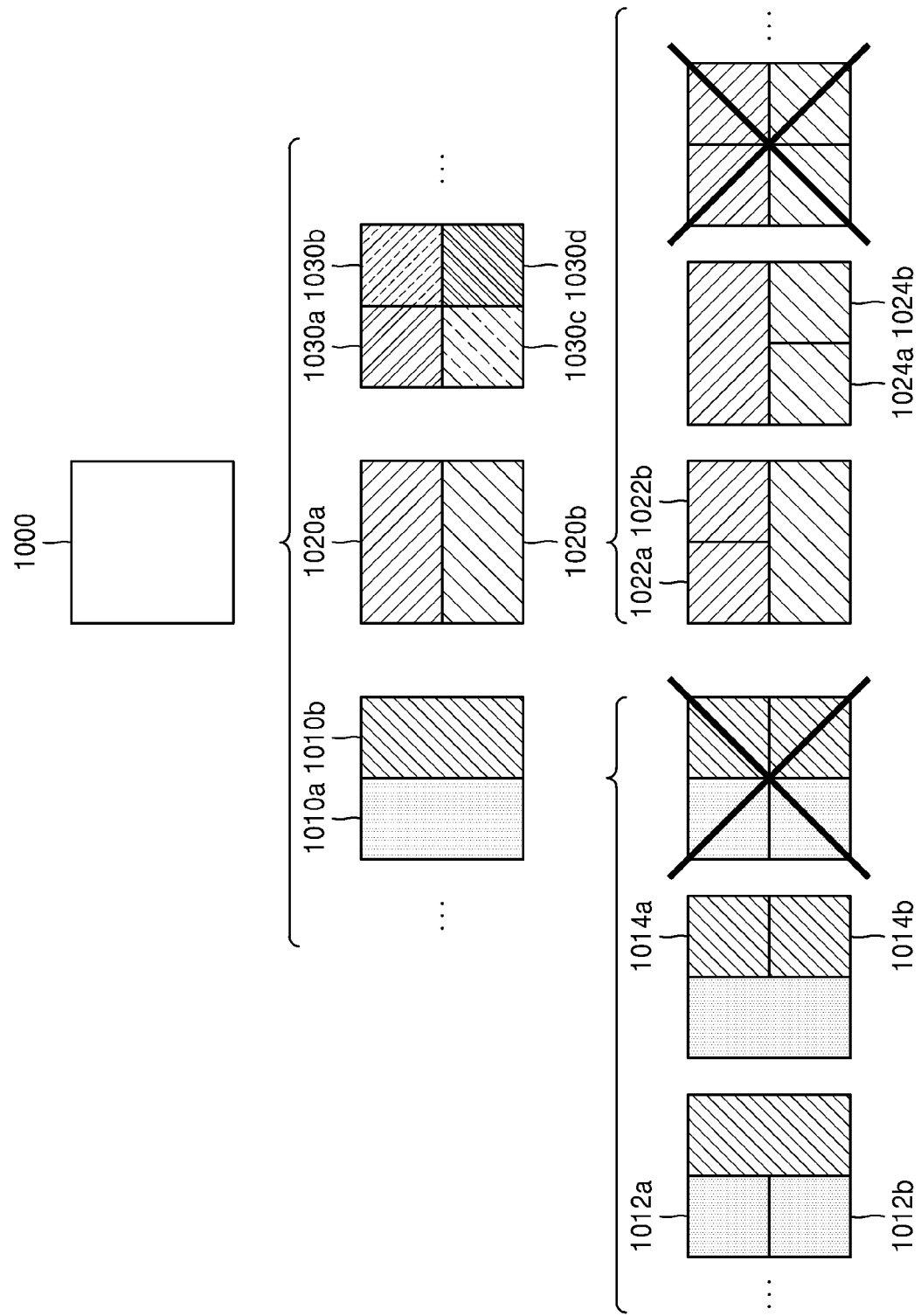
FIG. 10 illustrates that a shape of a second coding unit that is splittable is limited when the second coding unit having a non-square shape, which is determined when a first coding unit is split, satisfies a predetermined condition, according to an embodiment.

FIG. 10 illustrates that a shape of a second coding unit that is splittable is limited by the image decoding apparatus 100 when the second coding unit having a non-square shape, which is determined when a first coding unit 1000 is split, satisfies a predetermined condition, according to an embodiment.

According to an embodiment, the decoder 120 may determine, based on at least one of block shape information and split shape information obtained through the bitstream obtainer 110, to split the first coding unit 1000 having a square shape into second coding units 1010a, 1010b, 1020a, and 1020b having non-square shapes. The second coding units 1010a, 1010b, 1020a, and 1020b may be independently split. Accordingly, the decoder 120 may determine to split or not to split the second coding units 1010a, 1010b, 1020a, and 1020b based on at least one of block shape information and split shape information related to each of the second coding units 1010a, 1010b, 1020a, and 1020b. According to an embodiment, the decoder 120 may determine third coding units 1012a and 1012b by splitting the left second coding unit 1010a having a non-square shape and determined when the first coding unit 1000 is split in a vertical direction. However, when the left second coding unit 1010a is split in a horizontal direction, the decoder 120 may limit the right second coding unit 1010b not to be split in the horizontal direction like a direction in which the left second coding unit 1010a is split. When the right second coding unit 1010b is split in the same direction and third coding units 1014a and 1014b are determined, the third coding units 1012a, 1012b, 1014a, and 1014b may be determined when the left second coding unit 1010a and the right second coding unit 1010b are independently split in the horizontal direction. However, this is the same result as the decoder 120 splitting the first coding unit 1000 into four second coding nits 1030a through 1030d having square shapes based on at least one of block shape information and split shape information, and thus may be inefficient in terms of image decoding.

According to an embodiment, the decoder 120 may determine third coding units 1022*a*, 1022*b*, 1024*a*, and 1024*b* by splitting the second coding units 1020*a* or 1020*b* having a non-square shape and determined when the first coding unit 900 is split in the horizontal direction. However, when one of second coding units (for example, the top second coding unit 1020*a*) is split in the vertical direction, the decoder 120 may limit the other second coding unit (for example, the bottom second coding unit 1020*b*) not to be split in the vertical direction like a direction in which the top second coding unit 1020*a* is split based on the above reasons.

Figure 11:
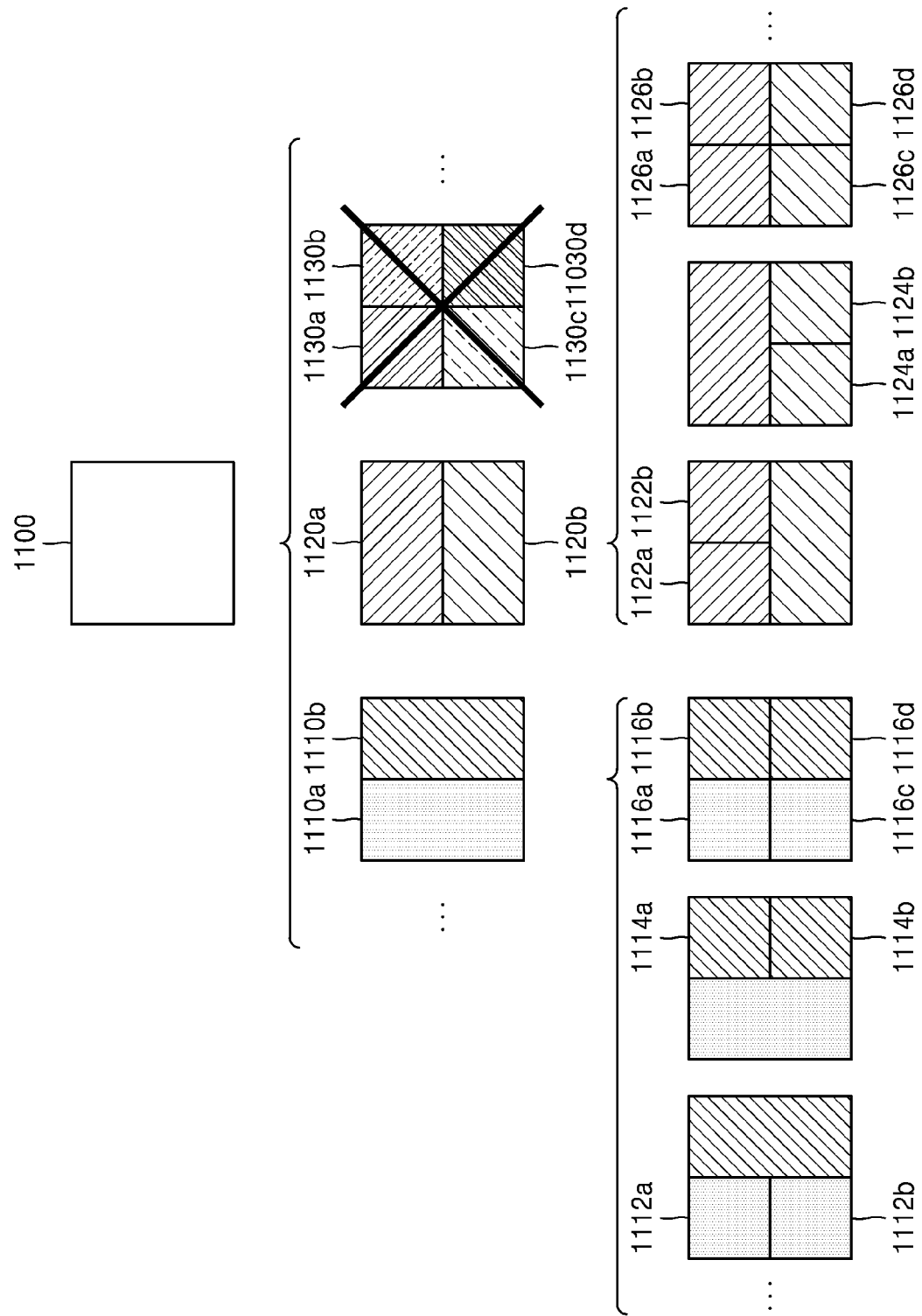
FIG. 11 illustrates a process of splitting a coding unit having a square shape when split shape information does not indicate splitting of the coding unit into four coding units having square shapes, according to an embodiment.

FIG. 11 illustrates a process of splitting, by the image decoding apparatus 100, a coding unit having a square shape when split shape information does not indicate splitting of the coding unit into four coding units having square shapes, according to an embodiment.

According to an embodiment, the decoder 120 may determine second coding units 1110*a*, 1110*b*, 1120*a*, 1120*b*, and so on by splitting a first coding unit 1100 based on at least one of block shape information and split shape information. The split shape information may include information about various shapes into which a coding unit is splittable, but sometimes, the information about various shapes may not include information for splitting a coding unit into four square coding units. According to such split shape information, the decoder 120 is unable to split the first coding unit 1100 having a square shape into four square second coding units 1130*a* through 1130*d*. Based on the split shape information, the decoder 120 may determine the second coding units 1110*a*, 1110*b*, 1120*a*, 1120*b*, and so on having non-square shapes.

According to an embodiment, the decoder 120 may independently split the second coding units 1110*a*, 1110*b*, 1120*a*, 1120*b*, and so on having non-square shapes. Each of the second coding units 1110*a*, 1110*b*, 1120*a*, 1120*b*, and so on may be split in a predetermined order through a recursive method that may be similar to a method of splitting the first coding unit 1100 based on at least one of block shape information and split shape information.

For example, the decoder 120 may determine third coding units 1112*a* and 1112*b* having square shapes by splitting the left second coding unit 1110*a* in a horizontal direction and determine third coding units 1114*a* and 1114*b* having square shapes by splitting the right second coding unit 1110*b* in a horizontal direction. In addition, the decoder 120 may determine third coding units 1116*a* through 1116*d* having square shapes by splitting both the left second coding unit 1110*a* and the right second coding unit 1110*b* in the horizontal direction. In this case, coding units may be determined in the same manner in which the first coding unit 1110 is split into the four square second coding units 1130*a* through 1130*d*.

As another example, the decoder 120 may determine third coding units 1122*a* and 1122*b* having square shapes by splitting the top second coding unit 1120*a* in the vertical direction and determine third coding units 1124*a* and 1124*b* having square shapes by splitting the bottom second coding unit 1120*b* in the vertical direction. In addition, the decoder 120 may determine third coding units 1122*a*, 1122*b*, 1124*a*, and 1124*b* having square shapes by splitting both the top second coding unit 1120*a* and the bottom second coding unit 1120*b* in the vertical direction. In this case, coding units may be determined in the same manner in which the first coding unit 1110 is split into the four square second coding units 1130*a* through 1130*d*.

Figure 12:
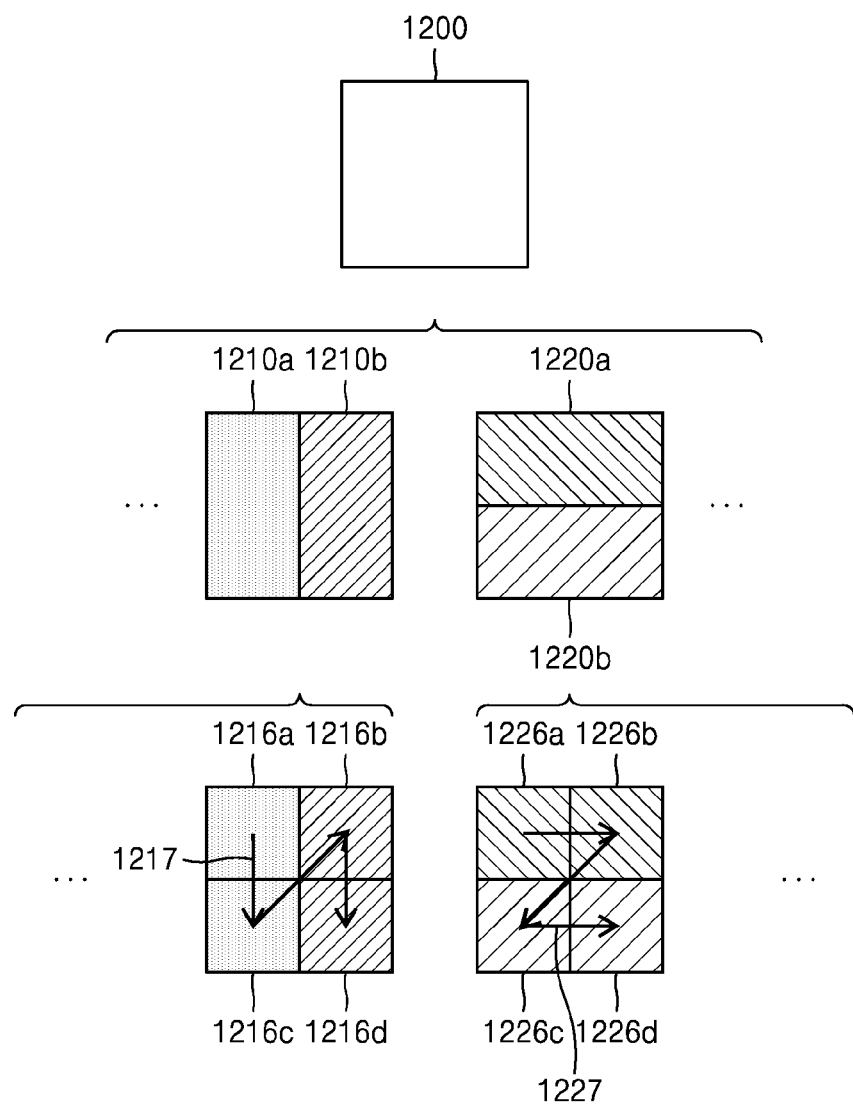
FIG. 12 illustrates that a processing order between a plurality of coding units may be changed according to a split process of a coding unit, according to an embodiment.

FIG. 12 illustrates that a processing order between a plurality of coding units may be changed according to a split process of a coding unit, according to an embodiment.

According to an embodiment, the decoder 120 may split a first coding unit 1200 based on block shape information and split shape information. When the block shape information indicates a square shape and the split shape information indicates that the first coding unit 1200 is split in at least one of a horizontal direction and a vertical direction, the decoder 120 may split the first coding unit 1200 to determine second coding units (for example, second coding units 1210*a*, 1210*b*, 1220*a*, 1220*b*, 1230*a*, 1230*b*, 1230*c*, 1230*d*, and so on). Referring to FIG. 12, the second coding units 1210*a*, 1210*b*, 1220*a*, and 1220*b* having non-square shapes and determined when the first coding unit 1200 is split only in the horizontal or vertical direction may each be independently split based on block shape information and split shape information about each of the second coding units 1210*a*, 1210*b*, 1220*a*, and 1220*b*. For example, the decoder 120 may determine third coding units 1216*a* through 1216*d* by splitting the second coding units 1210*a* and 1210*b* in the horizontal direction, wherein the second coding units 1210*a* and 1210*b* are generated when the first coding unit 1200 is split in the vertical direction, and may determine third coding units 1226*a* through 1226*d* by splitting the second coding units 1220*a* and 1220*b* in the horizontal direction, wherein the second coding units 1220*a* and 1220*b* are generated when the first coding unit 1200 is split in the horizontal direction. Since split processes of the second coding units 1210*a*, 1210*b*, 1220*a*, and 1220*b* have been described with reference to FIG. 10, details thereof are not provided again.

According to an embodiment, the decoder 120 may process coding units according to a predetermined order. Since characteristics about processing of coding units according to a predetermined order have been described above with reference to FIG. 7, details thereof are not provided again. Referring to FIG. 12, the decoder 120 may determine four square third coding units 1216*a* through 1216*d* or 1226*a* through 1226*d* by splitting the first coding unit 1200 having a square shape. According to an embodiment, the decoder 120 may determine a processing order of the third coding units 1216*a* through 1216*d* or 1226*a* through 1226*d* according to a shape of the first coding unit 1200 being split.

According to an embodiment, the decoder 120 may determine the third coding units 1216*a* through 1216*d* by splitting each of the second coding units 1210*a* through 1210*b* in the horizontal direction, wherein the second coding units 1210*a* and 1210*b* are generated when the first coding unit 1200 is split in the vertical direction, and the decoder 120 may process the third coding units 1216*a* through 1216*d* according to an order 1217 of first processing the third coding units 1216*a* and 1216*b* included in the left second coding unit 1210*a* in the vertical direction and then processing the third coding units 1216*c* and 1216*d* included in the right second coding unit 1210*b* in the vertical direction.

According to an embodiment, the decoder 120 may determine the second coding units 1226*a* through 1226*d* by splitting each of the second coding units 1220*a* and 1220*b* in the vertical direction, wherein the second coding units 1220*a* and 1220*b* are generated when the first coding unit 1200 is split in the horizontal direction, and the decoder 120 may process the third coding units 1226*a* through 1226*d* according to an order of first processing the third coding units 1226*a* and 1226*b* included in the top second coding unit 1220*a* in the horizontal direction and then processing the third coding units 1226c and 1226d included in the bottom second coding unit 1220b in the horizontal direction.

Referring to FIG. 12, the third coding units 1216a through 1216d and 1226a through 1226d having square shapes may be determined when each of the second coding units 1210a, 1210b, 1220a, and 1220b are split. The second coding units 1210a and 1210b determined when the first coding unit 1200 is split in the vertical direction and the second coding units 1220a and 1220b determined when the first coding unit 1200 is split in the horizontal direction have different shapes, but according to the third coding units 1216a through 1216d and 1226a through 1226d determined thereafter, the first coding unit 1200 is split into coding units having the same shapes. Accordingly, even when coding units having the same shapes are determined as a result by recursively splitting coding units through different processes based on at least one of block shape information and split shape information, the decoder 120 may process the coding units having the same shapes in different orders.

FIG. 13 illustrates a process of determining a depth of a coding unit when a shape and size of the coding unit changes, when a plurality of coding units are determined when the coding unit is recursively split, according to an embodiment.

According to an embodiment, the decoder 120 may determine a depth of a coding unit according to a predetermined criterion. For example, the predetermined criterion may be a length of a longer side of the coding unit. When a length of a longer side of a coding unit before being split is 2n times a length of a longer side of a current coding unit, wherein n>0, the decoder 120 may determine that a depth of the current coding unit is higher than a depth of the coding unit before being split by n. Hereinafter, a coding unit having a higher depth will be referred to as a coding unit of a lower depth.

Referring to FIG. 13, according to an embodiment, the decoder 120 may determine a second coding unit 1302 and a third coding unit 1304 of lower depths by splitting a first coding unit 1300 having a square shape, based on block shape information indicating a square shape (for example, block shape information may indicate '0: SQUARE'). When a size of the first coding unit 1300 having a square shape is 2N×2N, the second coding unit 1302 determined by splitting a width and a height of the first coding unit 1300 by $1/2^1$ may have a size of N×N. In addition, the third coding unit 1304 determined by splitting a width and a height of the second coding unit 1302 by ½ may have a size of N/2×N/2. In this case, a width and a height of the third coding unit 1304 correspond to $1/2^2$ times those of the first coding unit 1300. When a depth of the first coding unit 1300 is D, a depth of the second coding unit 1302, which is $1/2^1$ times the width and height of the first coding unit 1300, may be D+1, and a depth of the third coding unit 1304, which is $1/2^2$ times the width and height of the first coding unit 1300, may be D+2.

According to an embodiment, the decoder 120 may determine a second coding unit 1312 or 1322 and a third coding unit 1314 or 1324 of lower depths by splitting a first coding unit 1310 or 1320 having a non-square shape, based on block shape information indicating a non-square shape (for example, the block shape information may indicate '1: NS_VER' indicating that a height is longer than a width or indicate '2: NS_HOR' indicating that a width is longer than a height).

The decoder 120 may determine second coding units (for example, the second coding units 1302, 1312, 1322, and so on) by splitting at least one of the width and the height of the first coding unit 1310 having a size of N×2N. In other words, the decoder 120 may determine the second coding unit 1302 having a size of N×N or the second coding unit 1322 having a size of N×N/2 by splitting the first coding unit 1310 in a horizontal direction, or determine the second coding unit 1312 having a size of N/2×N by splitting the first coding unit 1310 in horizontal and vertical directions.

According to an embodiment, the decoder 120 may determine the second coding units (for example, the second coding units 1302, 1312, 1322, and so on) by splitting at least one of the width and the height of the first coding unit 1320 having a size of 2N×N. In other words, the decoder 120 may determine the second coding unit 1302 having a size of N×N or the second coding unit 1312 having a size of N/2×N by splitting the first coding unit 1320 in the vertical direction, or determine the second coding unit 1322 having a size of N×N/2 by splitting the first coding unit 1320 in the horizontal and vertical directions.

According to an embodiment, the decoder 120 may determine third coding units (for example, the third coding nits 1304, 1314, 1324, and so on) by splitting at least one of a width and a height of the second coding unit 1302 having a size of N×N. In other words, the decoder 120 may determine the third coding unit 1304 having a size of N/2×N/2, the third coding unit 1314 having a size of N/2²×N/2, or the third coding unit 1324 having a size of N/2×N/2² by splitting the second coding unit 1302 in vertical and horizontal directions.

According to an embodiment, the decoder 120 may determine the third coding units (for example, the third coding units 1304, 1314, 1324, and so on) by splitting at least one of a width and a height of the second coding unit 1312 having a size of N/2×N. In other words, the decoder 120 may determine the third coding unit 1304 having a size of N/2×N/2 or the third coding unit 1324 having a size of N/2×N/2² by splitting the second coding unit 1312 in a horizontal direction, or determine the third coding unit 1314 having a size of N/2²×N/2 by splitting the second coding unit 1312 in vertical and horizontal directions.

According to an embodiment, the decoder 120 may determine the third coding units (for example, the third coding units 1304, 1314, 1324, and so on) by splitting at least one of a width and a height of the second coding unit 1314 having a size of N×N/2. In other words, the decoder 120 may determine the third coding unit 1304 having a size of N/2×N/2 or the third coding unit 1314 having a size of N/2²×N/2 by splitting the second coding unit 1312 in a vertical direction, or determine the third coding unit 1324 having a size of N/2×N/2² by splitting the second coding unit 1312 in vertical and horizontal directions.

According to an embodiment, the decoder 120 may split coding units having square shapes (for example, the first coding units 1300, 1302, and 1304) in a horizontal or vertical direction. For example, the first coding unit 1300 having a size of 2N×2N may be split in the vertical direction to determine the first coding unit 1310 having a size of N×2N or in the horizontal direction to determine the first coding unit 1320 having a size of 2N×N/. According to an embodiment, when a depth is determined based on a length of a longest side of a coding unit, a depth of a coding unit determined when the first coding unit 1300, 1302, or 1304 is split in the horizontal or vertical direction may be the same as a depth of the first coding unit 1300, 1302, or 1304.

According to an embodiment, the width and height of the third coding unit 1314 or 1324 may be $1/2^2$ times the first coding unit 1310 or 1320. When the depth of the first coding unit 1310 or 1320 is D, the depth of the second coding unit 1312 or 1314, which is ½ times the width and height of the first coding unit 1310 or 1320, may be D+1, and the depth of the third coding unit 1314 or 1324, which is ¼₂ times the width and height of the first coding unit 1310 or 1320, may be D+2.

Figure 14:
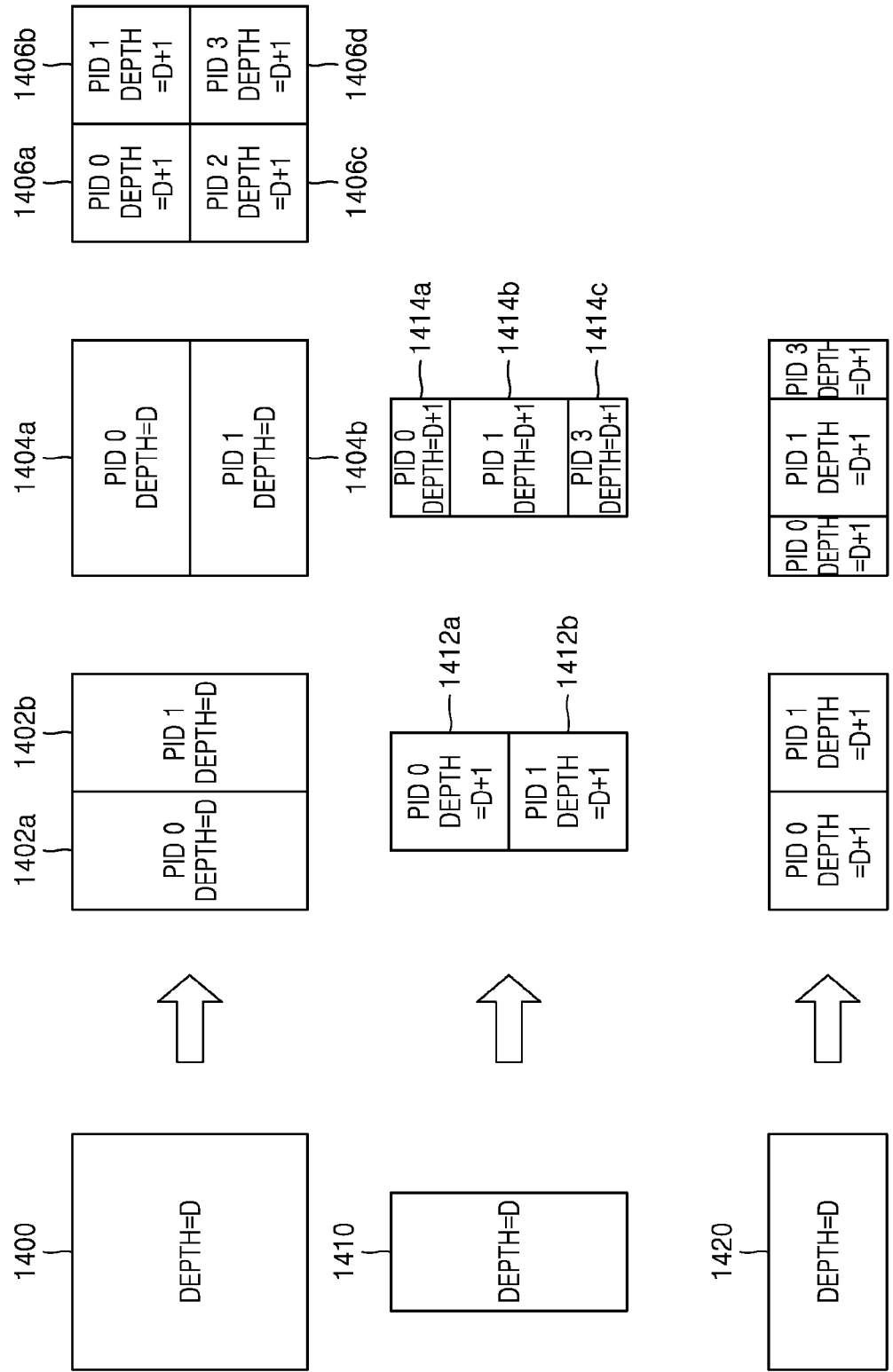
FIG. 14 illustrates a depth determinable according to shapes and sizes of coding units, and a part index (PID) for distinguishing the coding units, according to an embodiment.

FIG. 14 illustrates a depth determinable according to shapes and sizes of coding units, and a part index (PID) for distinguishing the coding units, according to an embodiment.

According to an embodiment, the decoder 120 may determine second coding units having various shapes by splitting a first coding unit 1400 having a square shape. Referring to FIG. 14, the decoder 120 may determine second coding units 1402a, 1402b, 1404a, 1404b, 1406a, 1406b, 1406c, and 1406d by splitting the first coding unit 1400 in at least one of a vertical direction and a horizontal direction, according to split shape information. In other words, the decoder 120 may determine the second coding units 1402a, 1402b, 1404a, 1404b, 1406a, 1406b, 1406c, and 1406d based on split shape information about the first coding unit 1400.

According to an embodiment, depths of the second coding units 1402a, 1402b, 1404a, 1404b, 1406a, 1406b, 1406c, and 1406d determined according to the split shape information about the first coding unit 1400 having a square shape may be determined based on lengths of longer sides. For example, since lengths of longer sides of the second coding units 1402a, 1402b, 1404a, and 1404b having non-square shapes are the same as a length of one side of the first coding unit 1400 having a square shape, depths of the first coding unit 1400 and the second coding units 1402a, 1402b, 1404a, and 1404b having non-square shapes may be D, i.e., the same. On the other hand, when the decoder 120 split the first coding unit 1400 into the four second coding units 1406a through 1406d having square shapes based on split shape information, since a length of one side of each of the second coding units 1406a through 1406d having square shapes is ½ of a length of one side of the first coding unit 1400, depths of the second coding units 1406a through 1406d may be D+1, i.e., one depth lower than the depth D of the first coding unit 1400.

According to an embodiment, the decoder 120 may split a first coding unit 1410 having a height longer than a width into a plurality of second coding units 1412a and 1412b, or 1414a, 1414b, and 1414c by splitting the first coding unit 1410 in a horizontal direction according to split shape information. According to an embodiment, the decoder 120 may split a first coding unit 1420 having a width longer than a height into a plurality of second coding units 1422a and 1422b, or 1424a, 1424b, and 1424c by splitting the first coding unit 1420 in a vertical direction according to split shape information.

According to an embodiment, depths of the second coding units 1412a, 1412b, 1414a, 1414b, 1416a, 1416b, 1416c, and 1416d determined according to the split shape information about the first coding unit 1410 or 1420 having a non-square shape may be determined based on lengths of longer sides. For example, since a length of one side of each of the second coding units 1412a and 1412b having square shapes is ½ of a length of one side of the first coding unit 1410 having a non-square shape in which a height is longer than a width, the depths of the second coding units 1402a, 1402b, 1404a, and 1404b having square shapes are D+1, i.e., one depth lower than the depth D of the first coding unit 1410 having a non-square shape.

In addition, the decoder 120 may split the first coding unit 1410 having a non-square shape into an odd number of the second coding units 1414a through 1414c based on split shape information. The odd number of second coding units 1414a through 1414c may include the second coding units 1414a and 1414c having non-square shapes and the second coding unit 1414b having a square shape. Here, since lengths of longer sides of the second coding units 1414a and 1414c having non-square shapes and a length of one side of the second coding unit 1414b having a square shape are ½ of a length of one side of the first coding unit 1410, depths of the second coding units 1414a through 1414c may be D+1, i.e., one depth lower than the depth D of the first coding unit 1410. The decoder 120 may determine depths of coding units related to the first coding unit 1420 having a non-square shape in which a width is longer than a height in the similar manner as depths of coding units related to the first coding unit 1410 are determined.

According to an embodiment, while determining PIDs for distinguishing coding units, the decoder 120 may determine the PIDs based on size ratios between the coding units when an odd number of the coding units do not have the same size. Referring to FIG. 14, the coding unit 1414b located at the center of the odd number of coding units 1414a through 1414c has the same width as the coding units 1414a and 1414c, but has a height twice higher than heights of the coding units 1414a and 1414c. In this case, the coding unit 1414b located at the center may include two of each of the coding units 1414a and 1414c. Accordingly, when a PID of the coding unit 1414b located at the center according to a scan order is 1, a PID of the coding unit 1414c located in a next order may be increased by 2, i.e., 3. In other words, values of PIDs may be discontinuous. According to an embodiment, the decoder 120 may determine whether an odd number of coding units have the same size based on discontinuity of PIDs for distinguishing the coding units.

(Determination of Tri-Split Using PID)

According to an embodiment, the image decoding apparatus 100 may determine whether a plurality of coding units determined when a current coding unit is split have certain split shapes based on values of PIDs for distinguishing the coding units. Referring to FIG. 14, the image decoding apparatus 100 may determine an even number of the coding units 1412a and 1412b or an odd number of the coding units 1414a through 1414c by splitting the first coding unit 1410 having a rectangular shape in which a height is longer than a width. The image decoding apparatus 100 may use a ID indicating each coding unit in order to distinguish a plurality of coding units. According to an embodiment, the PID may be obtained from a sample at a predetermined location (for example, an upper left sample) of each coding unit.

According to an embodiment, the image decoding apparatus 100 may determine a coding unit at a predetermined location from among coding units determined via split, by using PIDs for distinguishing the coding units. According to an embodiment, when split shape information about the first coding unit 1410 having a rectangular shape in which a height is longer than a width indicates split into three coding units, the image decoding apparatus 100 may split the first coding unit 1410 into the three coding units 1414a through 1414c. The image decoding apparatus 100 may allocate a PID to each of the three coding units 1414a through 1414c. The image decoding apparatus 100 may compare PIDs of coding units in order to determine a center coding unit from among an odd number of coding units. The image decoding apparatus 100 may determine the coding unit 1414b having a PID corresponding to a center value from among PIDs as a coding unit located at the center from among coding units determined when the first coding unit 1410 is split, based on PIDs of the coding units. According to an embodiment, the image decoding apparatus 100 may determine PIDs based on size ratios between coding units when the coding units do not have the same size, while determining the PIDs for distinguishing the coding units. Referring to FIG. 14, the coding unit 1414b generated when the first coding unit 1410 is split may have the same width as the coding units 1414a and 1414c, but may have a height twice higher than heights of the coding units 1414a and 1414c. In this case, when the PID of the coding unit 1414b located at the center is 1, the PID of the coding unit 1414c located in a next order may be increased by 2, i.e., 3. As such, when an increase range changes while PIDs are uniformly increasing, the image decoding apparatus 100 may determine that a coding unit is split into a plurality of coding units including a coding unit having a different size from other coding units. According to an embodiment, when split shape information indicates split into an odd number of coding units, the image decoding apparatus 100 may split a current coding unit into an odd number of coding units in which a coding unit at a predetermined location (for example, a center coding unit) has a different size from other coding units. In this case, the image decoding apparatus 100 may determine the center coding unit having the different size by using PIDs of the coding units. However, since the PID, and a size or location of a coding unit at a predetermined location are specified to describe an embodiment, and thus an embodiment is not limited thereto, and various PIDs, and various locations and sizes of a coding unit may be used.

According to an embodiment, the decoder 120 may use a predetermined data unit from which a coding unit starts to be recursively split.

Figure 15:
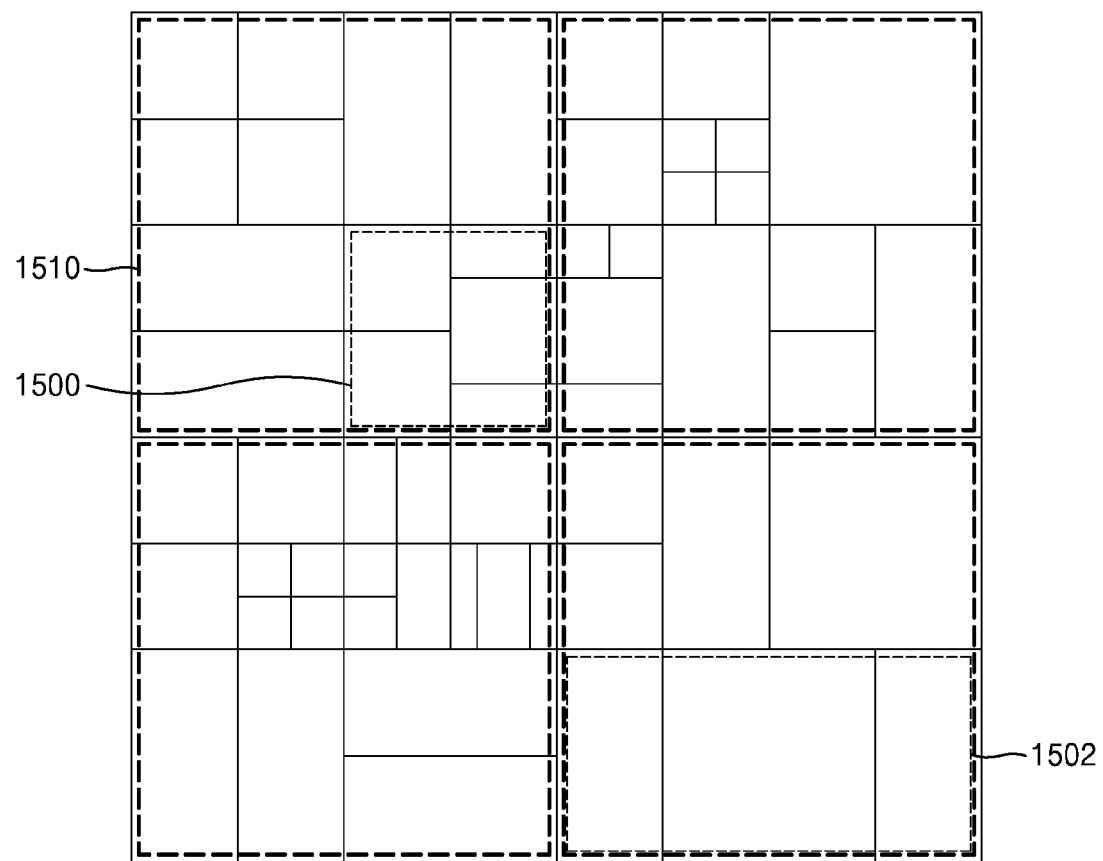
FIG. 15 illustrates that a plurality of coding units are determined according to a plurality of predetermined data units included in a picture, according to an embodiment.

FIG. 15 illustrates that a plurality of coding units are determined according to a plurality of predetermined data units included in a picture, according to an embodiment.

According to an embodiment, a predetermined data unit may be defined as a data unit from which a coding unit starts to be recursively split by using at least one of block shape information and split shape information. In other words, the predetermined data unit may correspond to a coding unit of an uppermost depth used while determining a plurality of coding units splitting a current picture. Hereinafter, for convenience of description, such a predetermined data unit is referred to as a reference data unit.

According to an embodiment, a reference data unit may indicate a predetermined size and shape. According to an embodiment, a reference coding unit may include M×N samples. Here, M and N may be the same, and may be an integer expressed as a multiple of 2. In other words, a reference data unit may indicate a square shape or a non-square shape, and may later be split into an integer number of coding units.

According to an embodiment, the decoder 120 of the image decoding apparatus 100 may split a current picture into a plurality of reference data units. According to an embodiment, the decoder 120 may split the plurality of reference data units obtained by splitting the current picture by using split information about each of the reference data units. Split processes of such reference data units may correspond to split processes using a quad-tree structure.

According to an embodiment, the decoder 120 may pre-determine a smallest size available for the reference data unit included in the current picture. Accordingly, the decoder 120 may determine the reference data unit having various sizes that are equal to or larger than the smallest size, and determine at least one coding unit based on the determined reference data unit by using block shape information and split shape information.

Referring to FIG. 15, the image decoding apparatus 100 may use a reference coding unit 1500 having a square shape, or may use a reference coding unit 1502 having a non-square shape. According to an embodiment, a shape and size of a reference coding unit may be determined according to various data units (for example, a sequence, a picture, a slice, a slice segment, and a largest coding unit) that may include at least one reference coding unit.

According to an embodiment, the bitstream obtainer 110 of the image decoding apparatus 100 may obtain, from a bitstream, at least one of information about a shape of a reference coding unit and information about a size of the reference coding unit, according to the various data units. Processes of determining at least one coding unit included in the reference coding unit 1500 having a square shape have been described above through processes of splitting the current coding unit 300 of FIG. 3, and processes of determining at least one coding unit included in the reference coding unit 1500 having a non-square shape have been described above through processes of splitting the current coding unit 400 or 450 of FIG. 4, and thus details thereof are not provided again.

According to an embodiment, in order to determine a size and shape of a reference coding unit according to some data units pre-determined based on a predetermined condition, the decoder 120 may use a PID for distinguishing the reference coding unit. In other words, the bitstream obtainer 110 may obtain, from a bitstream, only a PID for distinguishing a size and shape of a reference coding unit as a data unit satisfying a predetermined condition (for example, a data unit having a size equal to or smaller than a slice) from among various data units (for example, a sequence, a picture, a slice, a slice segment, and a largest coding unit), according to slices, slice segments, and largest coding units. The decoder 120 may determine the size and shape of the reference data unit according to data units that satisfy the predetermined condition, by using the PID. When information about a shape of a reference coding unit and information about a size of a reference coding unit are obtained from a bitstream and used according to data units having relatively small sizes, usage efficiency of the bitstream may not be sufficient, and thus instead of directly obtaining the information about the shape of the reference coding unit and the information about the size of the reference coding unit, only a PID may be obtained and used. In this case, at least one of the size and the shape of the reference coding unit related to the PID indicating the size and shape of the reference coding unit may be pre-determined. In other words, the decoder 120 may select at least one of the pre-determined size and shape of the reference coding unit according to the PID so as to determine at least one of the size and shape of the reference coding unit included in a data unit that is a criterion for obtaining the PID.

According to an embodiment, the decoder 120 may use at least one reference coding unit included in one largest coding unit. In other words, a largest coding unit splitting an image may include at least one reference coding unit, and a coding unit may be determined when each of the reference coding unit is recursively split. According to an embodiment, at least one of a width and height of the largest coding unit may be an integer times at least one of a width and height of the reference coding unit. According to an embodiment, a size of a reference coding unit may be equal to a size of a largest coding unit, which is split n times according to a quad-tree structure. In other words, the decoder 120 may determine a reference coding unit by splitting a largest coding unit n times according to a quad-tree structure, and split the reference coding unit based on at least one of block shape information and split shape information according to various embodiments.

Figure 16:
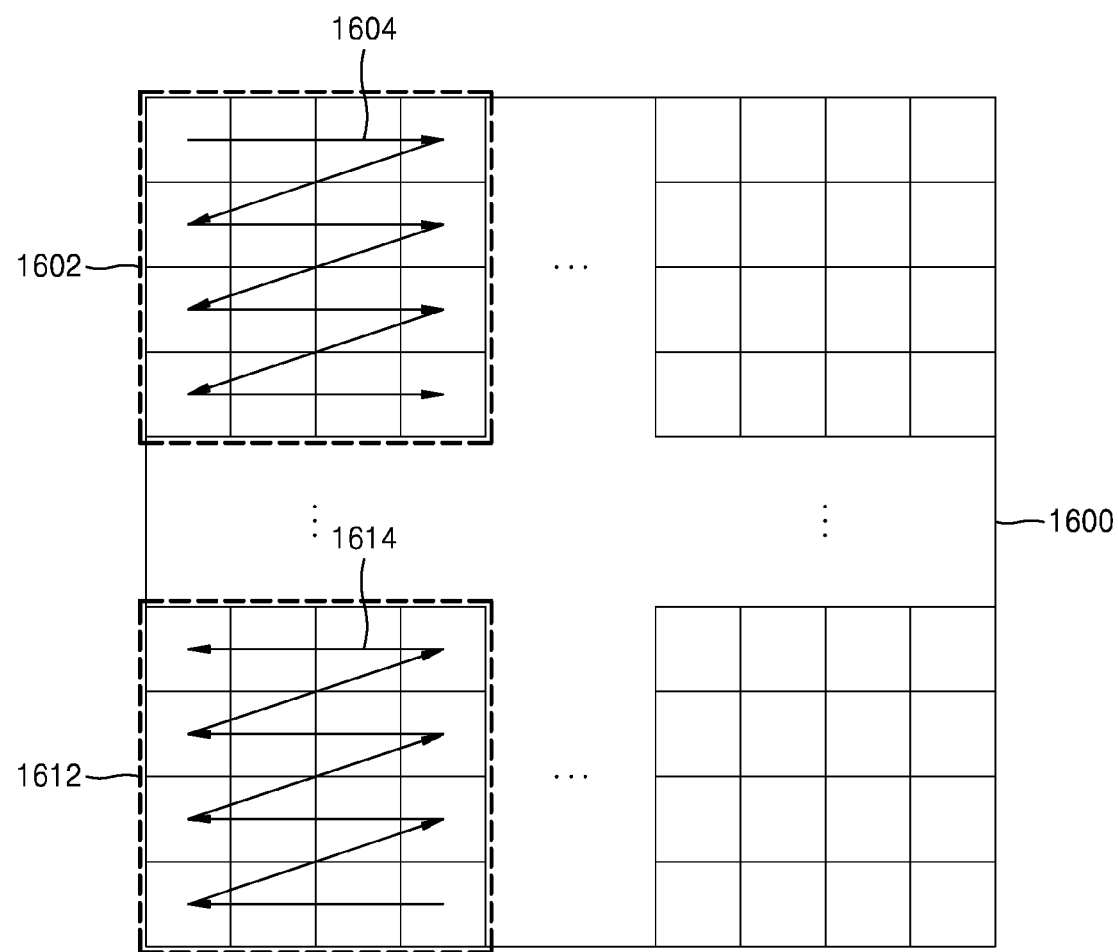
FIG. 16 illustrates a processing block that is a criterion in determining a determining order of a reference coding unit included in a picture, according to an embodiment.

FIG. 16 illustrates a processing block that is a criterion in determining a determining order of a reference coding unit included in a picture 1600, according to an embodiment.

According to an embodiment, the decoder 120 may determine at least one processing block splitting a picture. A processing block is a data unit including at least one reference coding unit splitting an image, and the at least one reference coding unit included in the processing block may be determined in a certain order. In other word, a determining order of the at least one reference coding unit determined in each processing block may correspond to one of various orders for determining a reference coding unit, and may vary according to processing blocks. A determining order of a reference coding unit determined per processing block may be one of various orders, such as a raster scan order, a Z-scan order, an N-scan order, an up-right diagonal scan order, a horizontal scan order, and a vertical scan order, but should not be limitedly interpreted by the scan orders.

According to an embodiment, the decoder 120 may determine a size of at least one processing block included in an image by obtaining information about a size of a processing block. The decoder 120 may obtain, from a bitstream, the information about a size of a processing block to determine the size of the at least one processing block included in the image. The size of the processing block may be a predetermined size of a data unit indicated by the information about a size of a processing block.

According to an embodiment, the bitstream obtainer 110 of the image decoding apparatus 100 may obtain, from the bitstream, the information about a size of a processing block according to certain data units. For example, the information about a size of a processing block may be obtained from the bitstream in data units of images, sequences, pictures, slices, and slice segments. In other words, the bitstream obtainer 110 may obtain, from the bitstream, the information about a size of a processing block according to such several data units, and the decoder 120 may determine the size of at least one processing block splitting the picture by using the obtained information about a size of a processing block, wherein the size of the processing block may be an integer times a size of a reference coding unit.

According to an embodiment, the decoder 120 may determine sizes of processing blocks 1602 and 1612 included in the picture 1600. For example, the decoder 120 may determine a size of a processing block based on information about a size of a processing block, the information obtained from a bitstream. Referring to FIG. 16, the decoder 120 may determine horizontal sizes of the processing blocks 1602 and 1612 to be four times a horizontal size of a reference coding unit, and a vertical size thereof to be four times a vertical size of the reference coding unit, according to an embodiment. The decoder 120 may determine a determining order of at least one reference coding unit in at least one processing block.

According to an embodiment, the decoder 120 may determine each of the processing blocks 1602 and 1612 included in the picture 1600 based on a size of a processing block, and a reference coding unit determiner 12 may determine a determining order of at least one reference coding unit included in each of the processing blocks 1602 and 1612. According to an embodiment, determining of a reference coding unit may include determining of a size of the reference coding unit.

According to an embodiment, the decoder 120 may obtain, from a bitstream, information about a determining order of at least one reference coding unit included in at least one processing block, and determine the determining order of the at least one reference coding unit based on the obtained information. The information about a determining order may be defined as an order or direction of determining reference coding units in a processing block. In other words, an order of determining reference coding units may be independently determined per processing block.

According to an embodiment, the image decoding apparatus 100 may obtain, from a bitstream, information about a determining order of a reference coding unit according to certain data units. For example, the bitstream obtainer 110 may obtain, from the bitstream, the information about a determining order of a reference coding unit according to data units, such as images, sequences, pictures, slices, slice segments, and processing blocks. Since the information about a determining order of a reference coding unit indicates a determining order of a reference coding unit in a processing block, the information about a determining order may be obtained per certain data unit including an integer number of processing blocks.

According to an embodiment, the image decoding apparatus 100 may determine at least one reference coding unit based on the determined order.

According to an embodiment, the bitstream obtainer 110 may obtain, from the bitstream, information about a determining order of a reference coding unit, as information related to the processing blocks 1602 and 1612, and the decoder 120 may determine an order of determining at least one reference coding unit included in the processing blocks 1602 and 1612 and determine at least one reference coding unit included in the picture 1600 according to a determining order of a coding unit. Referring to FIG. 16, the decoder 120 may determine determining orders 1604 and 1614 of at least one reference coding unit respectively related to the processing blocks 1602 and 1612. For example, when information about a determining order of a reference coding unit is obtained per processing block, determining orders of a reference coding unit related to the processing blocks 1602 and 1612 may be different from each other. When the determining order 1604 related to the processing block 1602 is a raster scan order, reference coding units included in the processing block 1602 may be determined according to the raster scan order. On the other hand, when the determining order 1614 related to the processing block 1612 is an inverse order of a raster scan order, reference coding units included in the processing block 1612 may be determined in the inverse order of the raster scan order.

The decoder 120 may decode determined at least one reference coding unit, according to an embodiment. The decoder 120 may decode an image based on reference coding units determined through above embodiments. Examples of a method of decoding a reference coding unit may include various methods of decoding an image.

According to an embodiment, the image decoding apparatus 100 may obtain, from a bitstream, and use block shape information indicating a shape of a current coding unit or split shape information indicating a method of splitting the current coding unit. The block shape information or the split shape information may be included in a bitstream related to various data units. For example, the image decoding apparatus 100 may use the block shape information or split shape information, which is included in a sequence parameter set, a picture parameter set, a video parameter set, a slice header, and a slice segment header. In addition, the image decoding apparatus 100 may obtain, from a bitstream, and use syntax related to the block shape information or the split shape information, according to largest coding units, reference coding units, and processing blocks.

According to an embodiment, the decoder 120 may determine a type of split shapes for splitting a coding unit to be different according to predetermined data units. The decoder 120 of the image decoding apparatus 100 may differently determine a combination of shapes for splitting a coding unit according to predetermined data units (for example, sequences, pictures, and slices), according to an embodiment.

Figure 17:
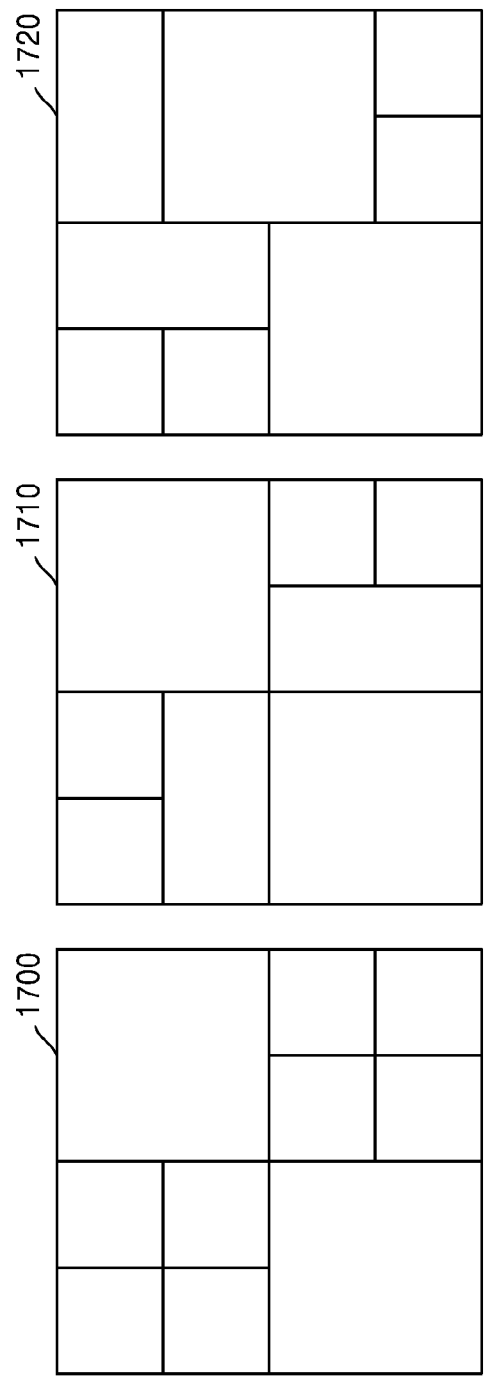
FIG. 17 illustrates coding units determinable per picture when a combination of shapes for splitting a coding unit is different per picture, according to an embodiment.

FIG. 17 illustrates coding units determinable per picture when a combination of shapes for splitting a coding unit is different per picture, according to an embodiment.

Referring to FIG. 17, the decoder 120 may differently determine, per picture, a combination of split shapes for splitting a coding unit. For example, the decoder 120 may decode an image by using, from among at least one picture included in the image, a picture 1700 splittable into 4 coding units, a picture 1710 splittable into 2 or 4 coding units, and a picture 1720 splittable into 2, 3, or 4 coding units. In order to split the picture 1700 into a plurality of coding units, the decoder 120 may only use split shape information indicating that the picture 1700 is split into 4 square coding units. In order to split the picture 1710, the decoder 120 may only use split shape information indicating that the picture 1710 is split into 2 or 4 coding units. In order to split the picture 1720, the decoder 120 may only use split shape information indicating that the picture 1720 is split into 2, 3, or 4 coding units. Such a combination of split shapes is only an embodiment for describing operations of the image decoding apparatus 100, and thus the combination of split shapes should not be limitedly interpreted to the above embodiments, and should be interpreted that a combination of various split shapes is usable according to predetermined data units.

According to an embodiment, the bitstream obtainer 110 of the image decoding apparatus 100 may obtain a bitstream including an index indicating a combination of split shape information according to predetermined data units (for example, sequences, pictures, and slices). For example, the bitstream obtainer 110 may obtain the index indicating a combination split shape information from a sequence parameter set, a picture parameter set, or a slice header. The decoder 120 of the image decoding apparatus 100 may determine a combination of split shapes for splitting a coding unit according to predetermined data units by using the obtained index, and thus use a combination of different split shapes according to predetermined data units.

FIG. 18 illustrates various shapes of a coding unit determinable based on split shape information representable in a binary code, according to an embodiment.

According to an embodiment, the image decoding apparatus 100 may split a coding unit into various shapes by using block shape information and split shape information obtained through the bitstream obtainer 110. Shapes for splitting a coding unit may correspond to various shapes including the shapes described above through the above embodiments.

Referring to FIG. 18, the decoder 120 may split a coding unit having a square shape in at least one of a horizontal direction and a vertical direction and split a coding unit having a non-square shape in a horizontal direction or a vertical direction, based on split shape information.

According to an embodiment, when the decoder 120 is able to split a coding unit having a square shape in a horizontal direction and a vertical direction to obtain four square coding units, split shapes that may be indicated by split shape information about the coding unit having a square shape may be four. According to an embodiment, split shape information may be represented as two binary code figures, and a binary code may be allocated per split shape. For example, when a coding unit is not split, split shape information may be represented in (00)b, when a coding unit is split in horizontal and vertical directions, split shape information may be represented in (01)b, when a coding unit is split in a horizontal direction, split shape information may be represented in (10)b, and when a coding unit is split in a vertical direction, split shape information may be represented in (11)b.

According to an embodiment, when the decoder 120 splits a coding unit having a non-square shape in a horizontal or vertical direction, types of split shape that may be indicated by split shape information may be determined based on how many coding units a coding unit is split into. Referring to FIG. 18, the decoder 120 may split a coding unit having a non-square shape up to three coding units, according to an embodiment. The decoder 120 may split a coding unit into two coding units, and in this case, split shape information may be represented in (10)b. The decoder 120 may split a coding unit into three coding units, and in this case, split shape information may be represented in (11)b. The decoder 120 may determine not to split a coding unit, and in this case, split shape information may be represented in (0)b. In other words, the decoder 120 may use variable length coding (VLC) instead of fixed length coding (FLC) in order to use a binary code to indicate split shape information.

According to an embodiment, referring to FIG. 18, a binary code of split shape information indicating that a coding unit is not split may be represented in (0)b. When split shape information indicating that a coding unit is not split is set to (00)b, binary codes of split shape information in 2 bits may be all used despite that there is no split shape information set to (01)b. However, as shown in FIG. 18, when three split shapes are used for a coding unit having a non-square shape, the decoder 120 may determine not to split a coding unit even by using a binary code (0)b of 1 bit as split shape information, and thus a bitstream may be efficiently used. However, split shapes of a coding unit having a non-square shape, which are indicated by split shape information, should not be limitedly interpreted to 3 shapes shown in FIG. 18, and should be interpreted to various shapes including the above embodiments.

Figure 19:
FIG. 19 illustrates other shapes of a coding unit determinable based on split shape information representable in a binary code, according to an embodiment.
Figure 19:
Figure 19:
Figure 19:
Figure 19:
Figure 19:
Figure 19:
Figure 19:
Figure 19:

FIG. 19 illustrates other shapes of a coding unit determinable based on split shape information representable in a binary code, according to an embodiment.

Referring to FIG. 19, the decoder 120 may split a coding unit having a square shape in a horizontal or vertical direction and split a coding unit having a non-square shape in a horizontal or vertical direction, based on split shape information. In other words, split shape information may indicate that a coding unit having a square shape is split only in one direction. In this case, a binary code of split shape information indicating that a coding unit having a square shape is not split may be represented in (0)b. When split shape information indicating that a coding unit is not split is set to (00)b, binary codes of split shape information in 2 bits may be all used despite that there is no split shape information set to (01)b. However, as shown in FIG. 19, when three split shapes are used for a coding unit having a square shape, the decoder 120 may determine not to split a coding unit even by using a binary code (0)b of 1 bit as split shape information, and thus a bitstream may be efficiently used. However, split shapes of a coding unit having a square shape, which are indicated by split shape information, should not be limitedly interpreted to 3 shapes shown in FIG. 19, and should be interpreted to various shapes including the above embodiments.

According to an embodiment, block shape information or split shape information may be represented by using a binary code, and such information may be immediately generated in a bitstream. Alternatively, block shape information or split shape information represented in a binary code may not be immediately generated in a bitstream, and may be used as a binary code input during context adaptive binary arithmetic coding (CABAC).

Processes of obtaining, by the image decoding apparatus 100, syntax about block shape information or split shape information through CABAC, according to an embodiment, will now be described. A bitstream including a binary code about the syntax may be obtained through the bitstream obtainer 110. The decoder 120 may detect a syntax element indicating the block shape information or the split shape information by performing inverse-binarization on a bin string included in the obtained bitstream. According to an embodiment, the decoder 120 may obtain a group of binary bin strings corresponding to the syntax element to be decoded and decode each bin by using probability information, and the decoder 120 may repeat such operations until a bin string including such decoded bins is the same as one of bin strings pre-obtained. The decoder 120 may determine the syntax element by performing inverse-binarization on the bin string.

According to an embodiment, the decoder 120 may determine syntax about a bin string by performing a decoding process of adaptive binary arithmetic coding, and may update a probability model bout bins obtained through the bitstream obtainer 110. Referring to FIG. 18, the bitstream obtainer 110 of the image decoding apparatus 100 may obtain a bitstream indicating a binary code indicating split shape information, according to an embodiment. The decoder 120 may determine syntax about the split shape information by using the obtained binary code having a size of 1 bit or 2 bits. The decoder 120 may update a probability about each bit from among the 2 bits of the binary code in order to determine the syntax about the split shape information. In other words, the decoder 120 may determine a probability that may have a value or 0 or 1 while decoding a next bin based on whether a first bin from among the binary codes of 2 bits is 0 or 1.

According to an embodiment, while determining the syntax, the decoder 120 may update the probability about the bins used while decoding the bins of the bin string about the syntax, and the decoder 120 may determine that a certain bit in the bin string has the same probability without updating the probability.

Referring to FIG. 18, while determining syntax by using a bin string indicating split shape information about a coding unit having a non-square shape, the decoder 120 may determine the syntax about the split shape information by using one bin having a value of 0 when the coding unit having a non-square shape is not split. In other words, when block shape information indicates that a current coding unit has a non-square shape, a first bin of a bin string about the split shape information may be 0 when the current coding unit is not split, and may be 1 when the current coding unit is split into 2 or 3 coding units. Accordingly, a probability of a first bin of a bin string of split shape information about a coding unit having a non-square shape being 0 may be ⅓, and being 1 may be ⅔. As described above, since split shape information indicating that a coding unit having a non-square shape is not split may represent only a bin string of 1 bit having a value of 1, the decoder 120 may determine syntax about the split shape information by determining whether a second bin is 0 or 1 only when the first bin of the split shape information is 1. According to an embodiment, when the first bin about the split shape information is 1, the decoder 120 may decode a bin determining that probabilities of the second bin being 0 or 1 are the same.

According to an embodiment, the image decoding apparatus 100 may use various probabilities about each bin while determining a bin of a bin string about split shape information. According to an embodiment, the decoder 120 may differently determine probabilities of bins about split shape information based on a direction of a non-square block. According to an embodiment, the decoder 120 may differently determine probabilities of bins about split shape information based on an area or a length of a longer side of a current coding unit. According to an embodiment, the decoder 120 may differently determine probabilities of bins about split shape information based on at least one of a shape and a length of a longer side of a current coding unit.

According to an embodiment, the decoder 120 may determine that probabilities of bins about split shape information are the same with respect to coding units having at least a predetermined size. For example, the decoder 120 may determine that probabilities of bins about split shape information are the same with respect to coding units having a size of at least 64 samples based on a length of a longer side of each coding unit.

According to an embodiment, the decoder 120 may determine an initial probability of bins forming a bin string of split shape information based on a slice type (for example, I-slice, P-slice, B-slice, or the like).

Figure 20:
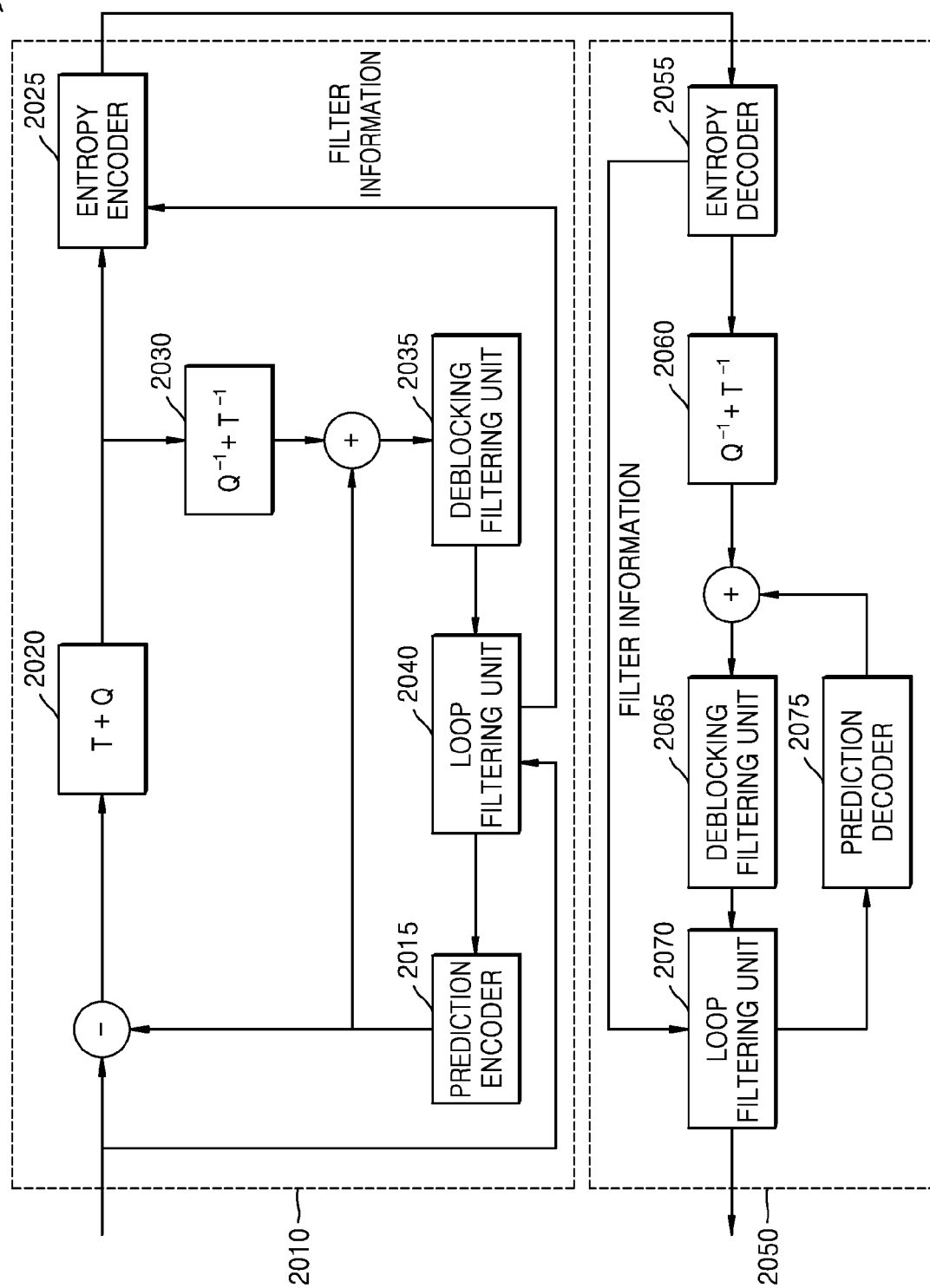
FIG. 20 is a block diagram of an image encoding and decoding system performing loop filtering.

FIG. 20 is a block diagram of an image encoding and decoding system performing loop filtering.

An encoder 2010 of an image encoding and decoding system 2000 transmits an encoded bitstream of an image, and a decoder 2050 outputs a reconstruction image by receiving and decoding a bitstream. Here, the encoder 2010 may have a similar structure as an image encoding apparatus 200 described later, and the decoder 2050 may have a similar structure as the image decoding apparatus 100.

In the encoder 2010, a prediction encoder 2015 outputs a reference image through inter prediction and intra prediction, and a transformer and quantizer 2020 outputs residual data between a reference image and a current input image by quantizing the residual data to a quantized transformation coefficient. An entropy encoder 2025 outputs a bitstream by encoding and transforming a quantized transformation coefficient. A quantized transformation coefficient is reconstructed to data in a spatial domain through an inverse quantizer and inverse transformer 2030, and data in a spatial domain is output as a reconstruction image through a deblocking filtering unit 2035 and a loop filtering unit 2040. A reconstruction image may be used as a reference image of a next input image through the prediction encoder 2015.

Encoded image data from a bitstream received by the decoder 2050 is reconstructed to residual data in a spatial domain through entropy decoder 2055 and an inverse quantizer and inverse transformer 2060. Image data in a spatial domain is formed as a reference image and residual data output from a prediction decoder 2075 are combined, and a deblocking filtering unit 2065 and a loop filtering unit 2070 may perform filtering on image data in a spatial domain to output a reconstruction image about a current original image. A reconstruction image may be used as a reference image of a next original image by the prediction decoder 2075.

The loop filtering unit 2040 of the encoder 2010 performs loop filtering by using filter information input according to a user input or a system setting. Filter information used by the filtering unit 2040 is output to the encoder 2010 to be transmitted to the decoder 2050 together with encoded image data. The loop filtering unit 2070 of the decoder 2050 may perform loop filtering based on filter information input from the decoder 2050.

Figure 21:
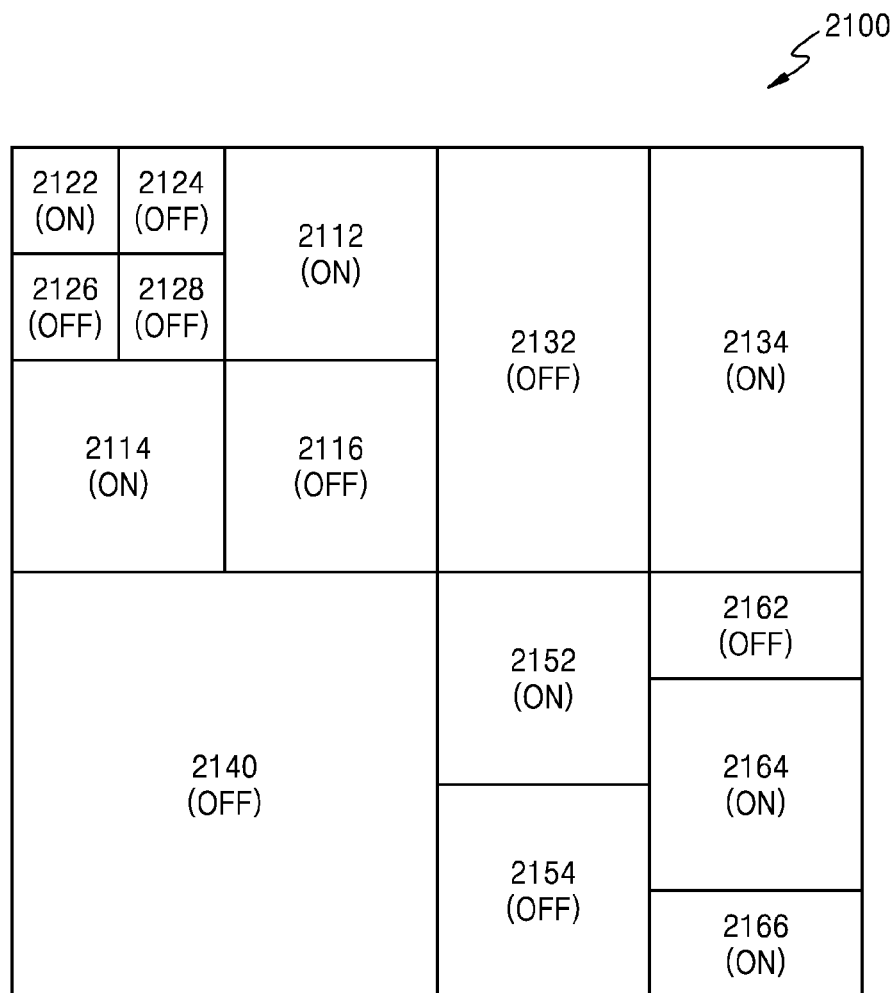
FIG. 21 illustrates an example of filtering units included in a largest coding unit and filtering performance information of a filtering unit, according to an embodiment.

FIG. 21 illustrates an example of filtering units included in a largest coding unit and filtering performance information of a filtering unit, according to an embodiment.

When filtering units of the loop filtering unit 2040 of the encoder 2010 and the loop filtering unit 2070 of the decoder 2050 are configured as data units similar to coding units according to an embodiment described above with reference to FIGS. 3 through 5, filter information may include block shape information and split shape information of a data unit for indicating a filtering unit, and filtering loop filtering performance information indicating whether loop filtering is performed on a filtering unit.

Filtering units included in a largest coding unit 2100 according to an embodiment may have the same block shapes and split shapes as coding units included in the largest coding unit 2100. Also, the filtering units included in the largest coding unit 2100 according to an embodiment may be split based on sizes of the coding units included in the largest coding unit 2100. Referring to FIG. 21, for example, the filtering units may include a filtering unit 2140 having a square shape and a depth of D, filtering units 2132 and 2134 having a non-square shape and a depth of D, filtering units 2112, 2114, 2116, 2152, 2154, and 2164 having a square shape and a depth of D+1, filtering units 2162 and 2166 having a non-square shape and a depth of D+1, and filtering units 2122, 2124, 2126, and 2128 having a square shape and a depth of D+2.

The block shape information, the split shape information (depth), and the loop filtering performance information of the filtering units included in the largest coding unit 2100 may be encoded as shown in Table 1.

TABLE 1

| Depth | Block Shape Information | Loop Filtering Performance Information |
| --- | --- | --- |
| D | 0: SQUARE | 0(2140) |
|  | 1: NS_VER | 0(2132), 1(2134) |
|  | 2: NS_HOR |  |
| D + 1 | 0: SQUARE | 1(2112), 1(2114), 0(2116), 1(2152), 0(2154), 1(2164) |
|  | 1: NS_VER |  |
|  | 2: NS_HOR | 0(2162), 1(2166) |
| D + 2 | 0: SQUARE | 1(2112), 0(2124), 0(2126), 0(2128) |
|  | 1: NS_VER |  |
|  | 2: NS_HOR |  |

Processes of determining a plurality of coding units when a coding unit is recursively split according to block shape information and block split information according to an embodiment have been described above through FIG. 13. Loop filtering performance information of filtering units according to an embodiment indicates that loop filtering is performed on the filtering units when a flag value is 1 and that loop filtering is not performed on the filtering units when a flag value is 0. Referring to Table 1, information of data units for determining filtering units to be filtered by the loop filtering units 2040 and 2070 may all be encoded and transmitted as filter information.

Since coding units configured according to an embodiment are coding units configured such as to minimize an error with an original image, it is expected to have a high spatial correlation in coding units. Accordingly, by determining a filtering unit based on a coding unit according to an embodiment, an operation of determining a filtering unit separately from determining of a coding unit may be omitted. Also, accordingly, by determining a filtering unit based on a coding unit according to an embodiment, information for determining a split shape of the filtering unit may be omitted, and thus a transmission bitrate of filter information may be saved.

In the above embodiments, it is described that a filtering unit is determined based on a coding unit according to an embodiment, but a filtering unit may be split based on a coding unit until an arbitrary depth, and thus a shape of a filtering unit may be determined up to only the arbitrary depth.

The determining of a filtering unit described in the above embodiments may be applied not only to loop filtering, but also to various embodiments, such as deblocking filtering and adaptive loop filtering.

According to an embodiment, the image decoding apparatus 100 may split a current coding unit by using at least one of block shape information and split shape information, wherein the block shape information may be pre-determined to indicate using only a square shape, and the split shape information may be pre-determined to indicate that the current coding unit is not split or split into four square coding units. In other words, coding units of the current coding unit may always have a square shape according to the block shape information, and the current coding unit may not be split or split into four square coding units based on the split shape information. The image decoding apparatus 100 may obtain, through the bitstream obtainer 110, a bitstream generated by using a predetermined coding unit that is pre-determined to only use such block shapes and split shapes, and the decoder 120 may use only the pre-determined block shapes and split shapes. In this case, the image decoding apparatus 100 may solve a compatibility problem with a predetermined encoding method by using a predetermined decoding method similar to the predetermined encoding method. According to an embodiment, when the image decoding apparatus 100 uses the predetermined decoding method using only the pre-determined block shapes and split shapes from among various shapes indicatable by the block shape information and the split shape information, the block shape information only indicates a square shape, and thus the image decoding apparatus 100 may not perform a process of obtaining the block shape information from the bitstream. Syntax indicating whether to use the predetermined decoding method may be used, and such syntax may be obtained from the bitstream according to data units having various shapes including a plurality of coding units, such as sequences, pictures, slice units, and largest coding units. In other words, the bitstream obtainer 110 may determine whether syntax indicating the block shape information is to be obtained from the bitstream based on syntax indicating whether the predetermined decoding method is used.

Figure 23:
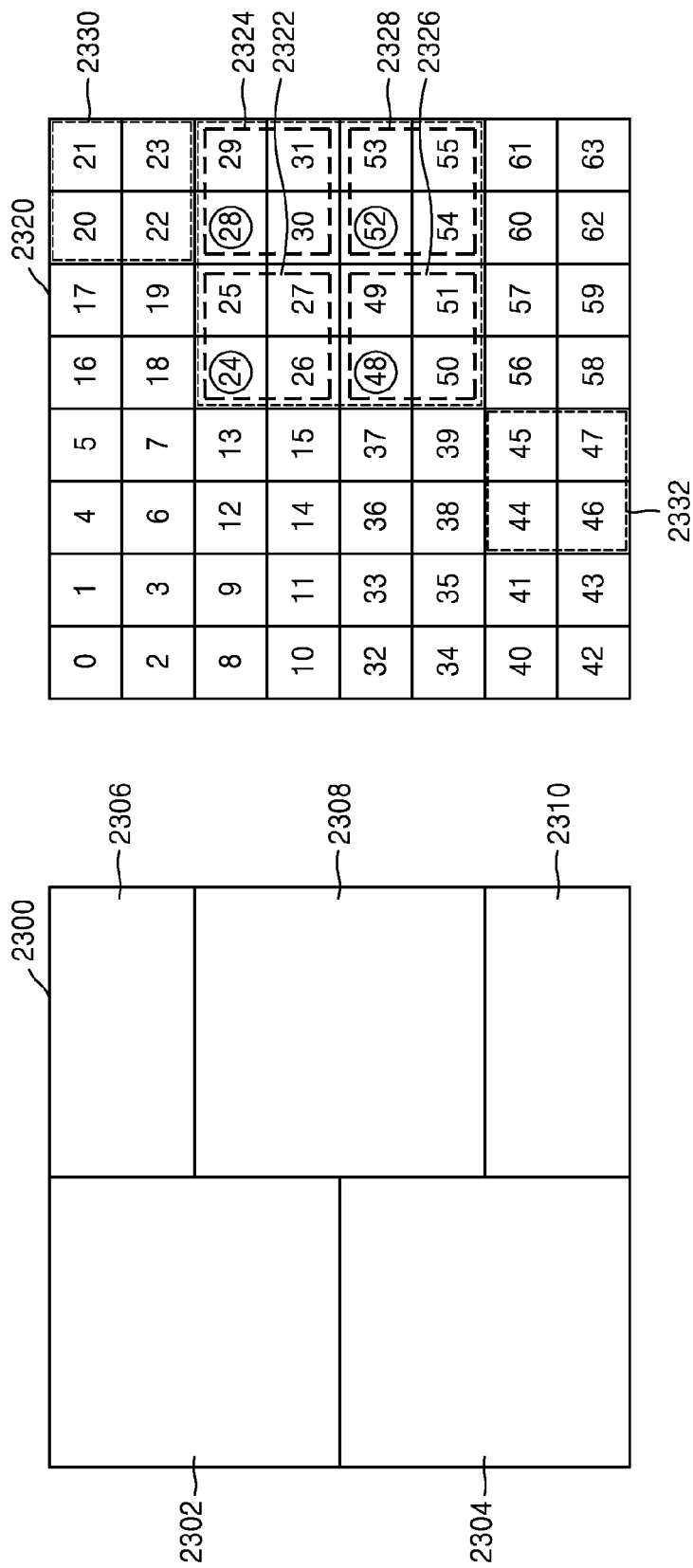
FIG. 23 illustrates an index according to a Z-scan order of a coding unit, according to an embodiment.

FIG. 23 illustrates an index according to a Z-scan order of a coding unit, according to an embodiment.

The image decoding apparatus 100 according to an embodiment may scan lower data units included in an upper data unit according to a Z-scan order. Also, the image decoding apparatus 100 according to an embodiment may sequentially access data according to an Z-scan index in a coding unit included in a largest coding unit or a processing block.

As described above with reference to FIGS. 3 and 4, the image decoding apparatus 100 according to an embodiment may split a reference coding unit into at least one coding unit. Here, the reference coding unit may include coding units having a square shape and coding units having a non-square shape. The image decoding apparatus 100 according to an embodiment may perform a data access according to a Z-scan index included in each coding unit in a reference coding unit. Here, a method of applying a Z-scan index may vary based on whether a coding unit having a non-square shape exists in the reference coding unit.

According to an embodiment, when a coding unit having a non-square shape does not exist in a reference coding unit, coding units of a lower depth in the reference coding unit may have continuous Z-scan indexes. For example, a coding unit of an upper depth may include four coding units of a lower depth, according to an embodiment. Here, boundaries of the four coding units of a lower depth, which are adjacent to each other, may be continuous, and the coding units of a lower depth may be scanned in a Z-scan order according to indexes indicating a Z-scan order. Indexes indicating a Z-scan order according to an embodiment may be set in numbers increasing according to the Z-scan order with respect to coding units. In this case, deeper coding units of the same depth may be scanned according to the Z-scan order.

According to an embodiment, when at least one coding unit having a non-square shape exists in a reference coding unit, the image decoding apparatus 100 may split each of the coding units in the reference coding unit into sub-blocks, and scan the sub-blocks according to a Z-scan order. For example, when a coding unit having a non-square shape in a vertical or horizontal direction exists in a reference coding unit, Z-scan may be performed by using sub-blocks that are split from the coding unit. Also, for example, when a reference coding unit is split into an odd number of coding units, Z-scan may be performed by using sub-blocks. A sub-block is a coding unit that is no longer split or a coding unit obtained by splitting an arbitrary coding unit, and may have a square shape. For example, four sub-blocks having a square shape may be split from a coding unit having a square shape. Also, for example, two sub-blocks having a square shape may be split from a coding unit having a non-square shape.

Referring to FIG. 23, for example, the image decoding apparatus 100 according to an embodiment may scan coding units 2302, 2304, 2306, 2308, and 2310 of a lower depth in a coding unit 2300, according to a Z-scan order. The coding unit 2300 and the coding units 2302 through 2310 are relatively an upper coding unit and lower coding units. The coding unit 2300 includes the coding units 2306 and 2310 having a non-square shape in a horizontal direction. The coding units 2306 and 2310 having a non-square shape have discontinuous boundaries with the coding units 2302 and 2304 having a square shape. Also, the coding unit 2308 has a square shape and is a coding unit located at the center when a coding unit having a non-square shape is split into an odd number of coding units. Like the coding units 2306 and 2310 having a non-square shape, the coding unit 2308 has discontinuous boundaries with the adjacent coding units 2302 and 2304 having a square shape.

When the coding unit 2300 includes the coding units 2306 and 2310 having a non-square shape or includes the coding unit 2308 located at the center when a coding unit having a non-square shape is split into an odd number of coding units, adjacent boundaries between coding units are discontinuous and thus continuous Z-scan indexes are unable to be set. Accordingly, the image decoding apparatus 100 may continuously set Z-scan indexes by splitting coding units into sub-blocks. Also, the image decoding apparatus 100 may perform continuous Z-scan on the coding units 2306 and 2310 having a non-square shape or the coding unit 2308 located at the center of an odd number of coding units having a non-square shape.

A coding unit 2320 shown in FIG. 23 is obtained by splitting the coding units 2302 through 2310 in the coding unit 2300 into sub-blocks. A Z-scan index may be set for each of the sub-blocks, and since adjacent boundaries between the sub-blocks are continuous, the sub-blocks may be scanned according to a Z-scan order. For example, in a decoding apparatus according to an embodiment, the coding unit 2308 may be split into sub-blocks 2322, 2324, 2326, and 2328. Here, the sub-blocks 2322 and 2324 may be scanned after a data process is performed on a sub-block 2330, and the sub-blocks 2326 and 2328 may be scanned after a data process is performed on a sub-block 2332. Also, sub-blocks may be scanned according to a Z-scan order.

In the above embodiments, data units may be scanned according to a Z-scan order for data storage, data loading, data accessing, etc.

Also, in the above embodiments, data units are scanned according to a Z-scan order, but a scan order of data units may vary, for example, a rater scan order, an N-scan order, an up-right diagonal scan order, a horizontal scan order, and a vertical scan order, and thus is not limited to the Z-scan order.

Also, in the above embodiments, coding units in a reference coding unit are scanned, but an embodiment is not limited thereto, and a target to be scanned may be an arbitrary block in a largest coding unit or a processing block.

Also, in the above embodiments, scanning is performed according to a Z-scan order by splitting a block into sub-blocks only when at least one block having a non-square shape exists, but for a simplified embodiment, scanning may be performed according to a Z-scan order by splitting a block into sub-blocks even when a block having a non-square shape does not exist.

The image decoding apparatus 100 according to an embodiment may generate prediction data by performing inter prediction or intra prediction on a coding unit, generate residual data by performing inverse transformation on a transformation unit included in a current coding unit, and reconstruct the current coding unit by using the generated prediction data and residual data.

A prediction mode of a coding unit according to an embodiment may be at least one of an intra mode, an inter mode, and a skip mode. According to an embodiment, a prediction mode may be independently selected according to coding units.

When a coding unit having a 2N×2N shape according to an embodiment is split into two coding units having a 2N×N shape or N×2N shape, inter mode prediction and intra mode prediction may be individually performed for each coding unit. Also, a skip mode may be applied to the coding units having a 2N×N shape or N×2N shape according to an embodiment.

Meanwhile, the image decoding apparatus 100 according to an embodiment may allow performing of bi-prediction in a skip mode of a coding unit having a 8×4 shape or 4×8 shape. In a skip mode, using of residual data with respect to a coding unit is omitted since only skip mode information is received with respect to the coding unit. Accordingly, in this case, an overhead of inverse quantization and inverse transformation may be saved. Instead, the image decoding apparatus 100 according to an embodiment may allow bi-prediction with respect to a coding unit to which a skip mode is applied, so as to increase decoding efficiency. Also, the image decoding apparatus 100 according to an embodiment may allow bi-prediction with respect to a coding unit having a 8×4 or 4×8 shape while setting an interpolation tap number to be relatively low during motion compensation, thereby efficiently using a memory bandwidth. For example, an interpolation filter having a tap number lower than 8 (for example, a 2-tap Interpolation filter) may be used instead of an 8-tap interpolation filter.

Also, the image decoding apparatus 100 according to an embodiment may signal intra or inter prediction information for each region included in a current coding unit by splitting the region in a pre-set shape (for example, diagonal-based split).

The image decoding apparatus 100 according to an embodiment may obtain a prediction sample of a current coding unit using an intra mode, by using adjacent samples of the current coding unit. Here, intra prediction is performed by using adjacent samples that are pre-reconstructed, and such adjacent samples are referred to as reference samples.

Figure 24:
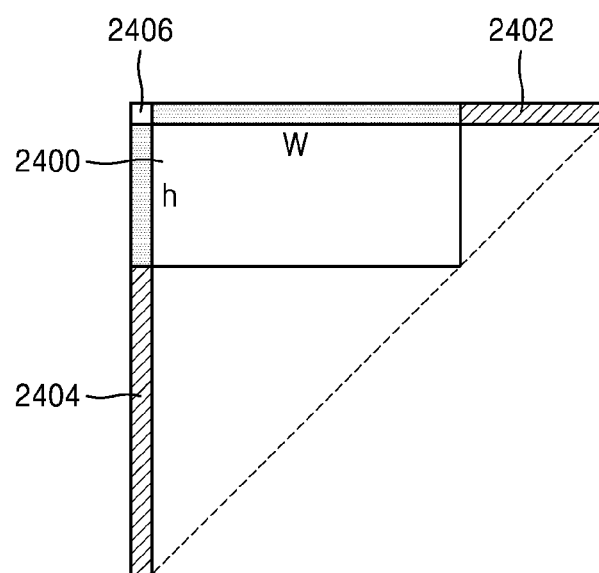
FIG. 24 is a diagram of a reference sample for intra prediction of a coding unit, according to an embodiment.

FIG. 24 is a diagram of a reference sample for intra prediction of a coding unit, according to an embodiment. Referring to FIG. 24, with respect to the coding unit 2300 which has a block shape of a non-square shape, a length of w in a horizontal direction, and a length of h in a vertical direction, w+h upper reference samples 2302, w+h left reference samples 2304, and one upper left reference sample 2306 are required, i.e., the total number of 2(w+h)+1 reference samples are required. In order to prepare a reference sample, padding is performed on a region where a reference sample does not exist, and a reference sample filtering process may be performed according to prediction mode so as to reduce a quantization error included in a reconstructed reference sample.

In the above embodiments, the number of reference samples when a current coding unit has a non-square shape has been described, and the number of reference samples is equally applied when a current coding unit has a square shape.

Operations related to an image decoding method performed by the image decoding apparatus 100 have been described above in the various embodiments hereinabove. Hereinafter, operations of the image encoding apparatus 200 performing an image encoding method, which are inverse processes of the image decoding method, will be described through various embodiments.

Figure 2:
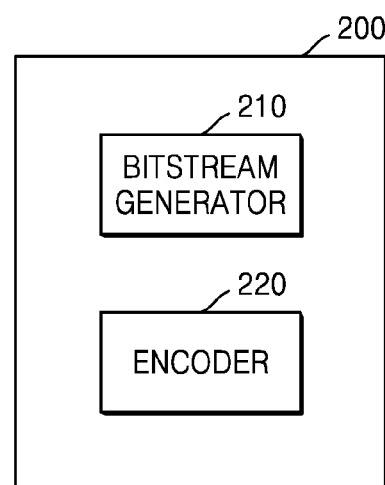
FIG. 2 is a block diagram of an image encoding apparatus capable of encoding an image based on at least one of block shape information and split shape information, according to an embodiment.

FIG. 2 is a block diagram of the image encoding apparatus 200 capable of encoding an image based on at least one of block shape information and split shape information, according to an embodiment.

Referring to FIG. 2, the image encoding apparatus 200 may include a bitstream generator 210 for generating a bitstream including predetermined information such as split shape information and block shape information, and an encoder 220 for encoding an image by using the predetermined information, according to an embodiment. According to an embodiment, the encoder 220 of the image encoding apparatus 200 may determine at least one coding unit for splitting an image based on at least one of block shape information and split shape information, and the bitstream generator 210 of the image encoding apparatus 200 may generate a bitstream including at least one of the block shape information and the split shape information. Here, the block shape information may indicate information or syntax indicating a shape of a coding unit, and the split shape information may indicate information or syntax indicating shapes into which a coding unit is split.

According to an embodiment, the encoder 220 of the image encoding apparatus 200 may determine a shape of a coding unit. For example, the coding unit may have a square shape or a non-square shape, and information indicating such a shape may be included in the block shape information.

According to an embodiment, the encoder 220 may determine shapes for splitting a coding unit. The encoder 220 may determine a shape of at least one coding unit included in a coding unit, and the bitstream generator 210 may generate a bitstream including the split shape information including information about such a shape of the coding unit.

According to an embodiment, the encoder 220 may determine whether a coding unit is split or not. When the encoder 220 determines that a coding unit includes only one coding unit or that a coding unit is not split, the bitstream generator 210 may generate a bitstream including split shape information indicating that the coding unit is not split. Also, the encoder 220 may split a coding unit into a plurality of coding units, and the bitstream generator 210 may generate a bitstream including split shape information indicating that the coding unit is split into the plurality of coding units.

According to an embodiment, information indicating the number of coding units obtained by splitting a coding unit or indicating a direction of splitting the coding unit may be included in split shape information. For example, the split shape information may indicate at least one of a horizontal direction or a vertical direction for splitting a coding unit or indicate that a coding unit is not split.

FIG. 3 illustrates a process of determining, by the image encoding apparatus 200, at least one coding unit when a current coding unit is split, according to an embodiment.

According to an embodiment, the encoder 220 may determine a shape of a coding unit. For example, the encoder 220 may determine a shape of a coding unit having an optimum rate distortion (RD)-cost in consideration of RS costs.

According to an embodiment, the encoder 220 may determine that a current coding unit has a square shape, and may determine shapes into which a coding unit having a square shape is split accordingly. For example, the encoder 220 may determine whether to split a coding unit having a square shape or not, whether to split the coding unit in a vertical direction, whether to split the coding unit in a horizontal direction, or whether to split the coding unit into four coding units. Referring to FIG. 3, the encoder 220 may determine not to split the coding unit 310a having the same size as the current coding unit 300, or to split the current coding unit 300 into the coding units 310b through 310d based on split shape information indicating a predetermined split method.

Referring to FIG. 3, the encoder 220 may determine the two coding units 310b by splitting the current coding unit 300 in the vertical direction, according to an embodiment. The encoder 220 may determine the two coding units 310c by splitting the current coding unit 300 in the horizontal direction. The encoder 220 may determine the four coding units 310d by splitting the current coding unit 300 in the vertical and horizontal directions. However, split shapes into which a coding unit having a square shape is splittable are not limitedly interpreted to above shapes, and may include various shapes indicatable by split shape information. Predetermined split shapes into which a square coding unit is splittable will be described below in detail through various embodiments.

According to an embodiment, the bitstream generator 210 of the image encoding apparatus 200 may generate a bitstream including split shape information indicating shapes of the current coding unit 300 split by the encoder 220.

FIG. 4 illustrates a process of determining, by the image encoding apparatus 200, at least one coding unit when a coding unit having non-square shape is split, according to an embodiment.

According to an embodiment, the encoder 220 may determine whether not to split a current coding unit having a non-square shape, or whether to split the current coding unit by using a predetermined method. Referring to FIG. 4, the encoder 220 may determine not split the coding unit 410 or 460 having the same size as the current coding unit 400 or 450, or may determine the coding units 420a, 420b, 430a, 430b, 430c, 470a, 470b, 480a, 480b, and 480c according to a predetermined split method. The bitstream generator 210 of the image encoding apparatus 200 may generate a bitstream including split shape information indicating such split shapes. A predetermined split method of splitting a coding unit having a non-square shape will now be described in detail through various embodiments.

According to an embodiment, the encoder 220 may determine shapes into which a coding unit is split. Referring to FIG. 4, the encoder 220 may split the current coding unit 400 or 450 to determine the two coding units 420a and 420b, or 470a and 470b, and the bitstream generator 210 may generate a bitstream including split shape information indicating such split shapes.

According to an embodiment, when the encoder 220 splits the current coding unit 400 or 450 having a non-square shape, the current coding unit may be split in consideration of a location of a longer side of the current coding unit 400 or 450 having a non-square shape. For example, the encoder 220 may determine a plurality of coding units by splitting the longer side of the current coding unit 400 or 450 in consideration of a shape of the current coding unit 400 or 450, and the bitstream generator 210 may generate a bitstream including split shape information indicating such split shapes.

According to an embodiment, the encoder 220 may determine an odd number of coding units included in the current coding unit 400 or 450. For example, the encoder 220 may split the current coding unit 400 or 450 into the three coding units 430 through 430c or 480a through 480c. According to an embodiment, the encoder 220 may determine the odd number of coding units included in the current coding unit 400 or 450, wherein sizes of the coding units may not be the same. For example, the size of the predetermined coding unit 430b or 480b of the odd number of coding units 430a through 430c or 480a through 480c may be different from the sizes of the coding units 430a and 430c, or 480a and 480c. In other words, coding units determined by splitting the current coding unit 400 or 450 may have a plurality of types of sizes, and in some cases, the odd number of coding units 430a through 430c or 480a through 480c may have different sizes.

According to an embodiment, the encoder 220 may determine an odd number of coding units included in the current coding unit 400 or 450, and further, may set a predetermined limitation on at least one coding unit from among the odd number of coding units. Referring to FIG. 4, the encoder 220 may set a decoding process of the coding unit 430b or 480b located at the center of the three coding units 430a through 430c or 480a through 480c generated by splitting the current coding unit 400 or 450 to be different from those of the coding units 430a and 430c, or 480a and 480c. For example, the encoder 220 may limit the coding unit 430b or 480b located at the center to be no longer split unlike the coding units 430a and 430c, or 480a and 480c, or to be split only a predetermined number of times.

FIG. 5 illustrates a process of splitting, by the image encoding apparatus 200, a coding unit, according to an embodiment.

According to an embodiment, the encoder 220 may determine whether to split the first coding unit 500 having a square shape into coding units or not. According to an embodiment, the encoder 220 may determine the second coding unit 510 by splitting the first coding unit 500 in a horizontal direction, and a first coding unit, a second coding unit, and a third coding unit used according to an embodiment are terms used to understand split relationships between coding units. For example, a second coding unit may be determined when a first coding unit is split, and a third coding unit may be determined when a second coding unit is split. Relationships of first through third coding units used hereinafter may be understood to follow above characteristics.

According to an embodiment, the image encoding apparatus 200 may determine whether to split the second coding unit 510 into coding units based on at least one of block shape information and split shape information. Referring to FIG. 5, the encoder 220 may split the second coding unit 510 having a non-square shape and determined by splitting the first coding unit 500 into the at least one third coding unit 520a, 520b through 520d, or the like, or may not split the second coding unit 510 based on at least one of block shape information and split shape information. The bitstream generator 210 of the image encoding apparatus 200 may generate a bitstream including at least one of block shape information and split shape information, and the encoder 220 may determine a plurality of second coding units (for example, the second coding unit 510) having various shapes by splitting the first coding unit 500 based on at least one of block shape information and split shape information, wherein the second coding unit 510 may be split according to a method of splitting the first coding unit 500 based on at least one of block shape information and split shape information. According to an embodiment, when the first coding unit 500 is split into the second coding unit 510 based on at least one of block shape information and split shape information about the first coding unit 500, the second coding unit 510 may also be split into at least one third coding unit (for example, the third coding unit 520a, 520b, 520c, or 520d) based on at least one of block shape information and split shape information about the second coding unit 510. Accordingly, a square coding unit may be determined from a coding unit having a non-square shape, and a coding unit having a non-square shape may be determined when such a coding unit having a square shape is recursively split. Referring to FIG. 5, a predetermined coding unit (for example, a coding unit located at the center or a coding unit having a square shape) from among the odd number of third coding units 520b through 520d determined when the second coding unit 510 having a non-square shape is split may be recursively split. According to an embodiment, the third coding unit 520c having a square shape, which is one of the odd number of third coding units 520b through 520d, may be split in the horizontal direction into a plurality of fourth coding units. The fourth coding unit 540 having a non-square shape, which is one of the plurality of fourth coding units, may be split into a plurality of coding units again. For example, the fourth coding unit 540 having a non-square shape may be split into an odd number of coding units 550a through 550c again.

A coding unit may be recursively split based on at least one of split shape information and block shape information related to each coding unit. A method used to recursively split a coding unit may be described below through various embodiments.

According to an embodiment, the encoder 220 may determine to split each of the third coding units 520a through 520d, or the like into coding units or not to split the second coding unit 510 based on at least one of block shape information and split shape information. The encoder 220 may split the second coding unit 510 having a non-square shape into the odd number of third coding units 520b through 520d, according to an embodiment. The image encoding apparatus 200 may set a predetermined limitation on a predetermined third coding unit from among the odd number of third coding units 520b through 520d. For example, the image encoding apparatus 200 may limit the coding unit 520c located at the center of the odd number of third coding units 520b through 520d to be no longer split or to be split a settable number of times. Referring to FIG. 5, the image encoding apparatus 200 may limit the coding unit 520c located at the center of the odd number of third coding units 520b through 520d included in the second coding unit 510 having a non-square shape to be no longer split, to be split in a predetermined split shape (for example, split into only four coding units or into a shape corresponding to a shape of splitting the second coding unit 510), or to be split only a predetermined number of times (for example, split only n times, wherein n>0). However, the limitation on the coding unit 520c located at the center is only a simple embodiment, and thus should not be limitedly interpreted to the above embodiments, and may include various limitations for decoding the coding unit 520c located at the center differently from the coding units 520b and 520d.

According to an embodiment, the bitstream generator 210 of the image encoding apparatus 200 may generate a bitstream including at least one of block shape information and split shape information used to split a current coding unit, together with a bitstream related to a sample at a predetermined location in the current coding unit.

FIG. 6 illustrates a method of determining, by the encoder 220, a predetermined coding unit from among an odd number of coding units, according to an embodiment. The encoder 220 of the image encoding apparatus 200 may determine to split a current coding unit into coding units having various shapes and sizes, or not to split the current coding unit. Referring to FIG. 6, the bitstream generator 210 may generate a bitstream including at least one of block shape information and split shape information of the current coding unit 600, together with a bitstream related to a sample located at a predetermined location from among a plurality of samples included in the current coding unit 600 (for example, the sample 640 located at the center). However, the predetermined location in the current coding unit 600 related to at least one of the block shape information and the split shape information should not be limitedly interpreted to the center shown in FIG. 6, and the predetermined location may be interpreted to include various locations included in the current coding unit 600 (for example, uppermost, lowermost, left, right, upper left, lower left, upper right, and lower right locations).

According to an embodiment, the image encoding apparatus 200 may select one coding unit when a current coding unit is split into a predetermined number of coding units. A method of selecting one of a plurality of coding units may vary, and such a method will be described below through various embodiments.

According to an embodiment, the encoder 220 of the image encoding apparatus 200 may split a current coding unit into a plurality of coding units, and determine a coding unit at a predetermined location.

FIG. 6 illustrates a method of determining, by the image decoding apparatus 200, a coding unit at a predetermined location from an odd number of coding units, according to an embodiment.

According to an embodiment, the encoder 220 may use information indicating a location of each of the odd number of coding units so as to determine a coding unit located at the center from among the odd number of coding units. Referring to FIG. 6, the encoder 220 may determine the odd number of coding units 620a through 620c by splitting the current coding unit 600. The encoder 220 may determine the coding unit 620b at the center by using information about locations of the odd number of coding units 620a through 620c. For example, the encoder 220 may determine the coding unit 620b located at the center by determining locations of the coding units 620a through 620c based on information indicating a location of a predetermined sample included in the coding units 620a through 620c. In detail, the encoder 220 may determine the coding unit 620b located at the center by determining the locations of the coding units 620a through 620c based on information indicating locations of the upper left samples 630a through 640c of the coding units 620a through 620c.

According to an embodiment, the information indicating the locations of the upper left samples 630a through 640c respectively included in the coding units 620a through 620c may include information about locations or coordinates in a picture of the coding units 620a through 620c. According to an embodiment, the information indicating the locations of the upper left samples 630a through 630c respectively included in the coding units 620a through 620c may include information indicating widths or heights of the coding units 620a through 620c included in the current coding unit 600, and the widths or heights may correspond to information indicating differences between coordinates in the picture of the coding units 620a through 620c. In other words, the image encoding apparatus 200 may directly use the information about locations or coordinates in the picture of the coding units 620a through 620c, or may use the information about widths or heights of the coding units, which indicates the difference values between the coordinates, so as to determine the coding unit 620b located at the center.

According to an embodiment, the information indicating the location of the upper left sample 630a of the top coding unit 620a may indicate (xa, ya) coordinates, the information indicating the location of the upper left sample 630b of the center coding unit 620b may indicate (xb, yb) coordinates, and the information indicating the location of the upper left sample 630c of the bottom coding unit 620c may indicate (xc, yc) coordinates. The image encoding apparatus 200 may determine the center coding unit 620b by using the coordinates of the upper left samples 630a through 630c respectively included in the coding units 620a through 620c. For example, when the coordinates of the upper left samples 630a through 630c are aligned in an ascending order or descending order, the coding unit 620b including (xb, yb) that is coordinates of the upper left sample 630b may be determined as a coding unit located at the center from among the coding units 620a through 620c determined when the current coding unit 600 is split. Here, the coordinates indicating the locations of the upper left samples 630a through 630c may indicate coordinates indicating absolute locations in the picture, and further, may use (dxb, dyb) coordinates that are information indicating a relative location of the upper left sample 630b of the center coding unit 620b and (dxc, dyc) coordinates that are information indicating a relative location of the upper left sample 630c of the bottom coding unit 620c, based on the location of the upper left sample 630c of the top coding unit 620a. Also, a method of determining a coding unit at a predetermined location by using coordinates of a sample included in a coding unit as information indicating a location of the sample should not be limitedly interpreted to the above method, and may be interpreted to various arithmetic methods capable of using coordinates of a sample.

According to an embodiment, the image encoding apparatus 200 may split the current coding unit 600 into the plurality of coding units 620a through 620c, and select a coding unit from among the coding units 620a through 620c according to a predetermined criterion. For example, the encoder 220 may select the coding unit 620b that has a different size from among the coding units 620a through 620c.

According to an embodiment, the image encoding apparatus 200 may determine the width or height of each of the coding units 620a through 620c by using the (xa, ya) coordinates that are the information indicating the location of the upper left sample 630a of the top coding unit 620a, the (xb, yb) coordinates that are the information indicating the location of the upper left sample 630b of the center coding unit 620b, and the (xc, yc) coordinates that are the information indicating the location of the upper left sample 630c of the bottom coding unit 620c. The image encoding apparatus 200 may determine a size of each of the coding units 620a through 620c by using the coordinates (xa, ya), (xb, yb), and (xc, yc) indicating the locations of the coding units 620a through 620c.

According to an embodiment, the image encoding apparatus 200 may determine the width of the top coding unit 620a to xb-xa and the height to yb-ya. According to an embodiment, the encoder 220 may determine the width of the center coding unit 620b to xc-xb and the height to yc-yb. According to an embodiment, the encoder 220 may determine the width or height of the bottom coding unit by using the width or height of the current coding unit, and the width and height of the top coding unit 620a and the center coding unit 620b. The encoder 220 may determine one coding unit having a size different from other coding units based on the determined widths and heights of the coding units 620a through 620c. Referring to FIG. 6, the image encoding apparatus 200 may determine, as the coding unit at the predetermined location, the center coding unit 620b having a size different from sizes of the top coding unit 620a and the bottom coding unit 620c. However, since a process of determining, by the image encoding apparatus 200, a coding unit having a size different from other coding units is only an embodiment of determining a coding unit at a predetermined location by using sizes of coding units determined based on sample coordinates, various processes of determining a coding unit at a predetermined location by comparing sizes of coding units determined according to predetermined sample coordinates may be used.

However, a location of a sample considered to determine a location of a coding unit should not be limitedly interpreted to the upper left, but may be interpreted that information about a location of an arbitrary sample included in a coding unit is usable.

According to an embodiment, the image encoding apparatus 200 may select a coding unit at a predetermined location from among an odd number of coding units that are determined when a current coding unit is split, in consideration of a shape of the current coding unit. For example, when the current coding unit has a non-square shape in which a width is longer than a height, the encoder 220 may determine the coding unit at the predetermined location along a horizontal direction. In other words, the encoder 220 may determine a coding unit from among coding units having different locations in the horizontal direction, and set a limitation on the coding unit. When the current coding unit has the non-square shape in which the height is longer than the width, the encoder 220 may determine the coding unit at the predetermined location along a vertical direction. In other words, the encoder 220 may determine a coding unit from among coding units having different locations in the vertical direction, and set a limitation on the coding unit.

According to an embodiment, the image encoding apparatus 200 may use information indicating a location of each of an even number of coding units in order to determine a coding unit at a predetermined location from among the even number of coding units. The encoder 220 may determine the even number of coding units by splitting a current coding unit, and determine the coding unit at the predetermined location by using the information about the locations of the even number of coding units. Detailed processes thereof may be similar to processes of determining a coding unit at a predetermined location (for example, a center location) from among an odd number of coding units, which have been described above with reference to FIG. 6, and thus descriptions thereof are not provided again.

According to an embodiment, when a current coding unit having a non-square shape is split into a plurality of coding units, predetermined information used while splitting the current coding unit may be used in order to determine a coding unit at a predetermined location from among the plurality of coding units. For example, the encoder 220 of the image encoding apparatus 200 may use, as the predetermined information used while splitting the current coding unit, at least one of block shape information and split shape information in order to determine the coding unit located at the center from among the plurality of coding units obtained by splitting a current coding unit.

Referring to FIG. 6, the encoder 220 of the image encoding apparatus 200 may split the current coding unit 600 into the plurality of coding units 620a through 620c and determine the coding unit 620b located at the center from among the plurality of coding units 620a through 620c, and the bitstream generator 210 may generate a bitstream including at least one of block shape information and split shape information used while splitting the current coding unit 600. The encoder 220 may determine the coding unit 620b located at the center in consideration of a location of a sample related to the bitstream including at least one of the block shape information and the split shape information used while splitting the current coding unit 600. In other words, the bitstream including at least one of the block shape information and the split shape information of the current coding unit 600 may be generated together with a bitstream related to the sample 640 located at the center of the current coding unit 600, and at this time, the encoder 220 may determine the coding unit 620b I including the sample 640 as a coding unit located at the center from among the plurality of coding units 620*a* through 620*c*. However, information used to determine a coding unit located at the center from among a plurality of coding units obtained by splitting a current coding unit should not be limitedly interpreted to at least one of block shape information and split shape information used while splitting the current coding unit, and various types of information may be used. In this regard, processes of determining, by the image encoding apparatus 200, a coding unit at a predetermined location may be inverse processes of those of determining, by the image decoding apparatus 100, a coding unit at a predetermined location from among a plurality of coding units determined from a current coding unit, and thus detailed descriptions thereof are not provided again.

According to an embodiment, the image encoding apparatus 200 may determine at least one coding unit by splitting a current coding unit, and determine an order of decoding the at least one coding unit according to a predetermined block 9 for example, the current coding unit).

FIG. 7 illustrates an order of processing a plurality of coding units when the image encoding apparatus 200 determines the plurality of coding units by splitting a current coding unit, according to an embodiment. Since processes of processing, by the image encoding apparatus 200, the plurality of coding units in FIG. 7 may be similar to operations of the image decoding apparatus 100 described above with reference to FIG. 7, detailed descriptions thereof are not provided again.

FIG. 8 illustrates a process of determining, by the image encoding apparatus 200, that a current coding unit is split into an odd number of coding units when coding units are unable to be processed in a predetermined order, according to an embodiment.

According to an embodiment, the encoder 220 of the image encoding apparatus 200 may determine to split a current coding unit into an odd number, and the bitstream generator 210 may generate a bitstream including block shape information indicating a shape of the current coding unit and split shape information indicating a split shape (split into an odd number) of the current coding unit. Referring to FIG. 8, the first coding unit 800 having a square shape may be split into the second coding units 810*a* and 810*b* having a non-square shape, and the second coding units 810*a* and 810*b* may be independently split into the third coding units 820*a* through 820*e*. According to an embodiment, the encoder 220 may determine the plurality of coding units 820*a* and 820*b* by splitting, in a horizontal direction, the left coding unit 810*a* from among second coding units, and split the right coding unit 810*b* into the odd number of third coding units 820*c* through 820*e*. Processes of determining, by the image encoding apparatus 200, that a current coding unit is split into an odd number of coding units in FIG. 8 maybe opposite processes of operations of the image decoding apparatus 100 described above with reference to FIG. 8, detailed descriptions thereof are not provided.

FIG. 9 illustrates a process of determining at least one coding unit when the image encoding apparatus 200 splits the first coding unit 900, according to an embodiment. According to an embodiment, the encoder 220 may split the first coding unit 900, and the bitstream generator 210 may generate a bitstream including at least one of block shape information indicating a shape of the first coding unit and split shape information indicating a shape into which the first coding unit 900 is split. The first coding unit 900 having a square shape may be split into four coding units having a square shape or a plurality of coding units having a non-square shape. For example, referring to FIG. 9, the encoder 220 may split the first coding unit 900 into a plurality of coding units having a non-square shape, and in this case, the bitstream generator 210 may generate a bitstream including block shape information indicating that the first coding unit 900 is a square and split shape information indicating that the first coding unit 900 is split into coding units having a non-square shape. In detail, the encoder 220 may split the first coding unit 900 having a square shape into an odd number of coding units, i.e., the second coding units 910*a* through 910*c* determined in a vertical direction or the second coding units 920*a* through 920*c* determined in a horizontal direction, and in this case, the bitstream generator 210 may generate a bitstream including split shape information indicating that the first coding unit 900 is split in the horizontal or vertical direction to determine the odd number of coding units. Processes of determining, by the image encoding apparatus 200, at least one coding unit by splitting the first coding unit 900 in FIG. 9 are opposite processes of operations of the image decoding apparatus 100 described above with reference to FIG. 9, and thus detailed descriptions thereof are not provided again.

FIG. 10 illustrates that a shape of a second coding unit that is splittable is limited by the image encoding apparatus 200 when the second coding unit having a non-square shape, which is determined when the first coding unit 1000 is split, satisfies a predetermined condition, according to an embodiment.

According to an embodiment, the encoder 220 may determine to split the first coding unit 1000 having a square shape into the second coding units 1010*a* and 1010*b*, or 1020*a* and 1020*b* having a non-square shape. The second coding units 1010*a* and 1010*b*, or 1020*a* and 1020*b* may be independently split. Accordingly, the encoder 220 may determine to split the second coding units 1010*a* and 1010*b*, or 1020*a* and 1020*b* into a plurality of coding units or not to split the second coding units 1010*a* and 1010*b*, or 1020*a* and 1020*b*. Operations of limiting, by the image encoding apparatus 200, a shape of a second coding unit having a non-square shape that is splittable when the second coding unit satisfies a predetermined condition are opposite to operations of the image decoding apparatus 100 described above with reference to FIG. 10, detailed descriptions thereof are not provided again.

FIG. 11 illustrates a process of splitting, by the image encoding apparatus 200, a coding unit having a square shape when split shape information does not indicate splitting of the coding unit into four coding units having square shapes, according to an embodiment. In this regard, operations of the image encoding apparatus 200 may be opposite to operations of the image decoding apparatus 100 described above with reference to FIG. 11, and thus detailed descriptions thereof are not provided again.

FIG. 12 illustrates that a processing order between a plurality of coding units may be changed according to a split process of a coding unit, according to an embodiment.

According to an embodiment, the encoder 220 may split the first coding unit 1200 having a square shape in at least one of a horizontal direction and a vertical direction. According to an embodiment, the bitstream generator 210 may generate a bitstream including block shape information indicating that the first coding unit 1200 has a square shape and split shape information indicating that the first coding unit 1200 is split in at least one of the horizontal and vertical directions.

According to an embodiment, the encoder 220 may determine second coding units (for example, the second coding units 1210a, 1210b, 1220a, 1220b, 1230a, 1230b, 1230c, 1230d, or the like) by splitting the first coding unit 1200. Referring to FIG. 12, the second coding units 1210a and 1210b, or 1220a and 1220b having a non-square shape and determined when the first coding unit 1200 is split only in a horizontal or vertical direction may be independently split. For example, the encoder 220 may determine the third coding units 1216a through 1216d by splitting, in a horizontal direction, each of the second coding units 1210a and 1210b that are generated by splitting the first coding unit 1200 in a vertical direction, or may determine the third coding units 1226a through 1226d by splitting, in a horizontal direction, each of the second coding units 1220a and 1220b that are generated by splitting the first coding unit 1200 in a horizontal direction. Operations of the image encoding apparatus 200 related to FIG. 10 are opposite to operations of the image decoding apparatus 100 described above with reference to FIG. 10, detailed descriptions thereof are not provided again.

FIG. 13 illustrates a process of determining a depth of a coding unit when a shape and size of the coding unit changes, when a plurality of coding units are determined when the coding unit is recursively split, according to an embodiment. Since operations of the encoder 220 of the image encoding apparatus 200 determining a depth of a coding unit may be opposite to processes of the decoder 120 of the image decoding apparatus 100 determining a depth of a coding unit described above with reference to FIG. 13, details thereof are not provided again.

According to an embodiment, the image encoding apparatus 200 may determine whether a plurality of coding units determined when a current coding unit is split have certain split shapes based on values of PIDs for distinguishing the coding units. Referring to FIG. 14, the image encoding apparatus 200 may determine the even number of coding units 1412a and 1412b or the odd number of coding units 1414a through 1414c by splitting the first coding unit 1410 having a rectangular shape in which a height is longer than a width. The image encoding apparatus 200 may use a PID indicating each coding unit so as to distinguish each of a plurality of coding units. According to an embodiment, a PID may be obtained from a sample at a predetermined location of each coding unit (for example, an upper left sample). Since operations of the image encoding apparatus 200 related to FIG. 14 may be opposite to operations of the image decoding apparatus 100 described above with reference to FIG. 14, detailed descriptions thereof may not be provided again.

FIG. 15 illustrates that a plurality of coding units are determined according to a plurality of predetermined data units included in a picture, according to an embodiment. According to an embodiment, the encoder 220 may use the reference coding unit described above as a predetermined data unit from which a coding unit starts to be recursively split. Since operations of the image encoding apparatus 200 using a reference coding unit in FIG. 15 may be opposite to operations of the image decoding apparatus 100 using a reference coding unit described above with reference to FIG. 15, details thereof may not be provided again.

According to an embodiment, the bitstream generator 210 of the image encoding apparatus 200 may generate, according to the various data units, a bitstream including at least one of information about a shape of a reference coding unit and information about a size of a reference coding unit. Processes of determining at least one coding unit included in the reference coding unit 1500 having a square shape have been described above through processes of splitting the current coding unit 300 of FIG. 3, and processes of determining at least one coding unit included in the reference coding unit 1500 having a non-square shape have been described above through processes of splitting the current coding unit 400 or 450 of FIG. 4, and thus details thereof are not provided again.

According to an embodiment, the encoder 220 may use an index for identifying a size and shape of a reference coding unit so as to determine the size and shape of the reference coding unit according to some data units pre-determined based on a predetermined condition. In other words, the bitstream generator 210 may generate a bitstream including the index for identifying the size and shape of the reference coding unit, according to data units satisfying a predetermined condition (for example, a data unit having a size equal to or smaller than a slice) from among the various data units (for example, sequences, pictures, slices, slice segments, and largest coding units). The encoder 220 may use the index to determine the size and shape of the reference coding unit according to data units satisfying the predetermined condition. According to an embodiment, at least one of the size and shape of the reference coding unit, which is related to the index indicating the size and shape of the reference coding unit, may be pre-determined. In other words, the encoder 220 may select at least one of the pre-determined size and shape of the reference coding unit according to the index so as to determine at least one of the size and shape of the reference coding unit included in a data unit that is a criterion for obtaining the index. Since operations of the encoder 220 using an index for identifying a size and shape of a reference coding unit may be similar to operations of the decoder 120 described above, details thereof are not provided again.

FIG. 16 illustrates a processing block that is a criterion in determining a determining order of a reference coding unit included in the picture 1600, according to an embodiment.

According to an embodiment, the encoder 220 may determine a size of at least one processing block included in an image by obtaining information about a size of a processing block. The encoder 220 may determine the size of at least one processing block included in the image, and the bitstream generator 210 may generate a bitstream including the information about a size of a processing block. The size of such a processing block may be a predetermined size of a data unit indicated by the information about a size of a processing block.

According to an embodiment, the bitstream generator 210 of the image encoding apparatus 200 may generate the bitstream including the information about a size of a processing block, according to certain data units. For example, the bitstream including the information about a size of a processing block may be generated according to data units, such as images, sequences, pictures, slices, and slice segments. In other words, the bitstream generator 210 may generate the bitstream including the information about a size of a processing block according to the several data units, and the encoder 220 may determine the size of at least one processing block for splitting a picture, by using the information about a size of a processing block, wherein the size of the processing block may be an integer times a size of a reference coding unit.

According to an embodiment, the encoder 220 may determine sizes of the processing blocks 1602 and 1612 included in the picture 1600. For example, the encoder 220 may determine a size of a processing block based on information about a size of a processing block. Referring to FIG. 16, the encoder 220 may determine horizontal sizes of the processing blocks 1602 and 1612 to be four times a horizontal size of a reference coding unit, and vertical sizes thereof to be four times a vertical size of the reference coding unit, according to an embodiment. The encoder 220 may determine an order of determining at least one reference coding unit in at least one processing block. Since operations of the encoder 220 related to a processing block may be similar to those of the encoder 120 described above with reference to FIG. 16, details thereof are not provided again.

According to an embodiment, the bitstream generator 210 of the image encoding apparatus 200 may generate a bitstream including block shape information indicating a shape of a current coding unit or split shape information indicating a method of splitting the current coding unit. The block shape information or the split shape information may be included in a bitstream related to various data units. For example, the bitstream generator 210 of the image encoding apparatus 200 may use block shape information or split shape information included in a sequence parameter set, a picture parameter set, a video parameter set, a slice header, or a slice segment header. In addition, the bitstream generator of the image encoding apparatus 200 may generate a bitstream including syntax indicating block shape information or split shape information according to largest coding units, reference coding units, or processing blocks.

According to an embodiment, the encoder 220 may differently determine types of split shapes into which a coding unit is splittable according to predetermined data units. The encoder 220 of the image encoding apparatus 200 may differently determine a combination of shapes into which a coding unit is splittable according to predetermined data units (for example, sequences, pictures, and slices), according to an embodiment.

FIG. 17 illustrates coding units determinable per picture when a combination of shapes for splitting a coding unit is different per picture, according to an embodiment.

Referring to FIG. 17, the encoder 220 may determine a combination of split shapes into which a coding unit is splittable to be different per picture. For example, the encoder 220 may decode an image by using, from among at least one picture included in the image, the picture 1700 splittable into four coding units, the picture 1710 splittable into two or four coding units, and the picture 1720 splittable into 2, 3, or 4 coding units. The encoder 220 may split the picture 1700 into four square coding units. The encoder 220 may split the picture 1710 into 2 or 4 coding units. The encoder 220 may split the picture 1720 into 2, 3, or 4 coding units. Since the combination of split shapes described above is only an embodiment for describing operations of the image encoding apparatus 200, the combination of split shapes should not be limitedly interpreted by the embodiment, and various combinations of split shapes may be used per predetermined data unit.

According to an embodiment, the encoder 220 of the image encoding apparatus 200 may determine a combination of split shapes into which a coding unit is splittable, according to predetermined data units by using an index indicating a combination of split shape information, and accordingly, may use a combination of different split shapes according to predetermined data units. In addition, the bitstream generator 210 of the image encoding apparatus 200 may generate a bitstream including the index indicating a combination of split shape information, according to predetermined data units (for example, sequences, pictures, and slices). For example, the bitstream generator 210 may generate a bitstream including the index indicating a combination split shape information according to sequence parameter sets, picture parameter sets, slice headers, or slice segment header.

FIGS. 18 and 19 illustrate various shapes of a coding unit determinable based on split shape information representable in a binary code, according to an embodiment.

According to an embodiment, the encoder 220 of the image encoding apparatus 200 may split a coding unit into various shapes, and the bitstream generator 210 may generate a bitstream including block shape information and split shape information. Shapes of a coding unit that is splittable may correspond to various shapes including the shapes described above through above embodiments. Referring to FIG. 18, the encoder 220 may split a coding unit having a square shape in at least one of a horizontal direction and a vertical direction, and a coding unit having a non-square shape in a horizontal or vertical direction, based on split shape information. Since characteristics about a binary code of split shape information usable by the image encoding apparatus 200 may correspond to characteristics of the image decoding apparatus 100 described above through FIGS. 18 and 19, details thereof may not be provided again.

The image decoding apparatus 200 according to an embodiment may generate prediction data by performing inter prediction or intra prediction on a coding unit, generate residual data by performing inverse transformation on a transformation unit included in a current coding unit, and encode the current coding unit by using the generated prediction data and residual data.

A prediction mode of a coding unit according to an embodiment may be at least one of an intra mode, an inter mode, and a skip mode. According to an embodiment, a prediction mode having a smallest error may be selected by independently performing prediction according to coding units.

When a coding unit having a 2N×2N shape according to an embodiment is split into two coding units having a 2N×N shape or N×2N shape, inter mode prediction and intra mode prediction may be separately performed on each of the coding units. Also, according to an embodiment, the encoder 220 of the image encoding apparatus 200 may encode a coding unit by using a CU skip mode not only when the coding unit has a square shape, but also when the coding unit has a non-square shape. Since an image may be decoded by using a CU skip mode even when a coding unit determined based on at least one of block shape information and split shape information has not only a square shape, but also a non-square shape, a relatively more adaptive skip mode may be used, and thus image encoding/decoding efficiency may be increased. Characteristics of the image encoding apparatus 200 using a skip mode in such a coding unit having a non-square shape may be similar to those described above in relation to using of a skip mode of the image encoding apparatus 200, details thereof may not be provided again.

Figure 22:
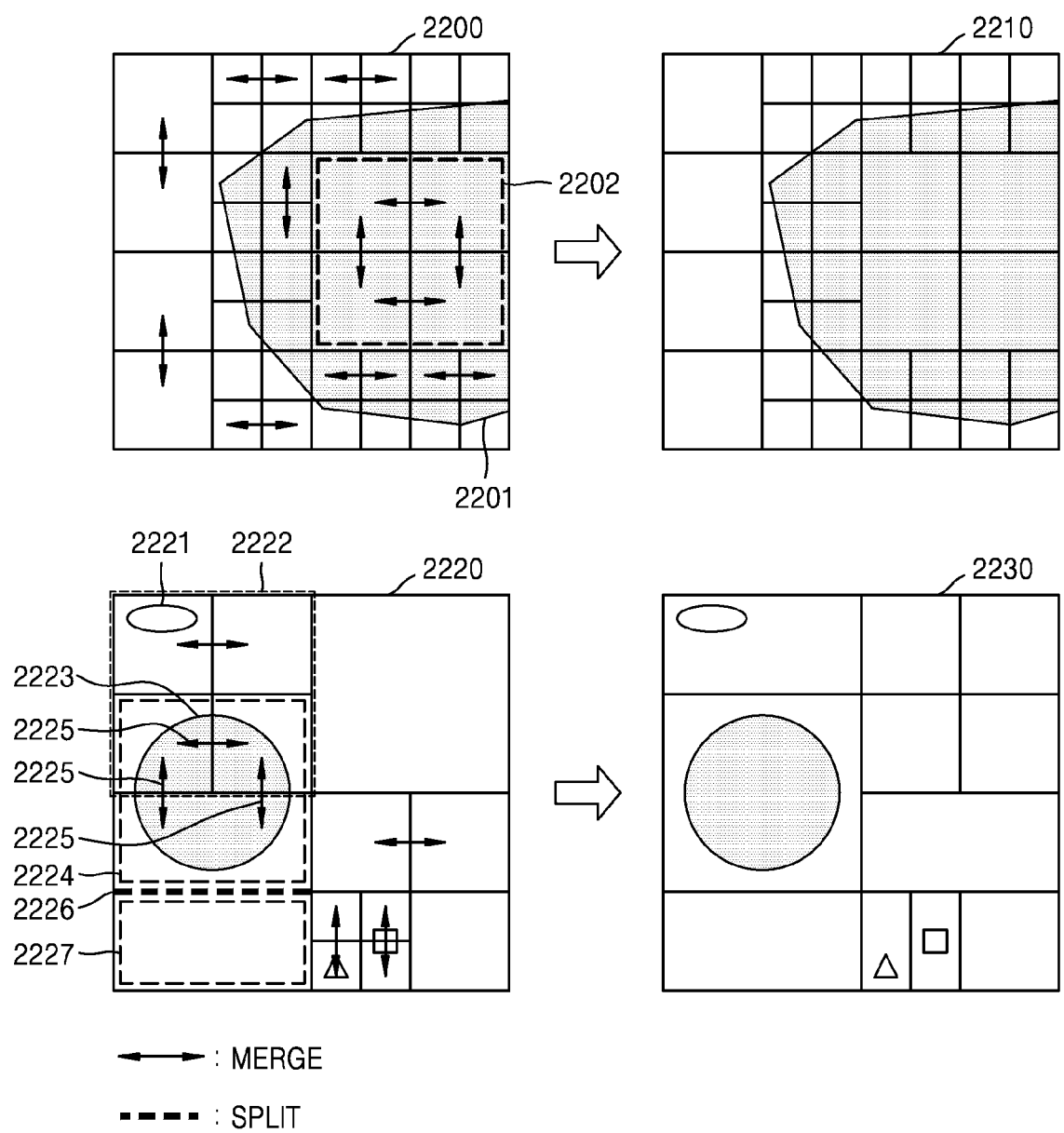
FIG. 22 illustrates a process of merging or splitting coding units determined according to a predetermined encoding method, according to an embodiment.

FIG. 22 illustrates a process of merging or splitting coding units determined according to a predetermined encoding method, according to an embodiment.

According to an embodiment, the image encoding apparatus 200 may determine coding units for splitting a picture by using the predetermined coding unit. For example, the image encoding apparatus 200 may split a coding unit of a current depth or four coding units of a lower depth based on split information of a coding unit. As described above, the image encoding apparatus 200 may determine a coding unit may using block shape information indicating that a current coding unit always has a square shape, and split shape information indicating that the current coding unit is not split or is split into four square coding units, according to an embodiment. Referring to FIG. 22, pictures 2200 or 2220 may be split into square coding units determined according to the predetermined coding unit.

However, when the above predetermined coding unit is used, whether a current coding unit is to be split is determined based on whether a relatively small object included in the current coding unit is suitable to be represented, and thus it may be impossible to encode a large object and a small object in a picture through one coding unit. Here, an object is a group of samples included in a picture and may denote a region of samples distinguished from other regions as the samples have similar sample values. Referring to FIG. 22, the image encoding apparatus 200 may determine a coding unit for decoding a small object 2221 by splitting a first coding unit 2222 into four coding units of a lower depth, so as to reconstruct the small object 2221. However, since a large object 2223 is not included in the current coding unit 2222, it is not suitable to decode the large object 2223 by using the current coding unit 2222, and in addition, since the current coding unit 2222 is split to decode the small object 2221, an unnecessary splitting process of a coding unit is performed to decode the large object 2223 as a result, and thus is inefficient. In other words, when the image encoding apparatus 200 is able to use one coding unit so as to encode a part of the large object 2223, image encoding may be efficiently performed.

According to an embodiment, the encoder 220 of the image encoding apparatus 200 may split a current coding unit by using at least one of block shape information and split shape information, wherein the block shape information may be pre-determined such that only a square shape is used and the split shape information may be pre-determined such that the current coding unit is not split or is split into four square coding units. Such processes may correspond to coding unit determining processes used in the above predetermined encoding method. In this case, the decoder may use a sample value included in a picture in order to merge coding units determined by using the predetermined encoding method or split the determined coding unit. For example, the decoder 220 may detect various objects included in a picture by examining regions having similar sample values, and perform merging/splitting processes of coding units based on regions of the detected objects.

Referring to FIG. 22, according to an embodiment, the encoder 220 may determine a plurality of coding units for splitting the picture 2200 by using the predetermined encoding method. However, processes of splitting a similar region into a plurality of coding units instead of one coding unit may be performed despite that a region 2201 having similar sample values exist in a picture. In this case, even when a coding unit is determined through a predetermined encoding method, the encoder 220 may merge the coding units into one coding unit 2202 and encode the coding unit 2202. Referring to FIG. 22, according to another embodiment, the encoder 220 may split the coding unit 2222 for encoding the small object 2221 into four coding units by using the predetermined encoding method. Since the coding units obtained as such are not all included in the large object 2223, the encoder 220 may perform a merging process 2225 on coding units having similar sample values to obtain one coding unit.

According to an embodiment, the encoder 220 may not split a coding unit or may determine coding units by splitting the coding unit into four coding units by using a predetermined encoding method, by using split information of the coding unit, and then split the coding units again in consideration of sample values of samples included in a picture. In other words, in order to determine coding units according to objects, the decoder 120 may not only merge coding units, but also split a pre-determined coding unit. Referring to FIG. 22, the encoder 220 may merge coding units for the object 2223, and perform a splitting process 2226 on the merged coding units for the object 2223 so as to determine an optimized coding unit for the object 2223. In other words, the encoder 220 may determine, as a coding unit 2227 separately from the object 2223, a region not including the object 2223 through the splitting process 2226.

When a bitstream about an image is generated after merging or splitting coding units determined according to a predetermined encoding method through operations of the image encoding apparatus 200, the image decoding apparatus 100 may decode the image by performing an image decoding method corresponding to inverse operations of the image encoding method, after obtaining the bitstream.

FIG. 23 illustrates an index according to a Z-scan order of a coding unit, according to an embodiment.

The encoder 220 of the image encoding apparatus 200 according to an embodiment may scan lower data units included in an upper data unit according to a Z-scan order. Also, the image encoding apparatus 200 according to an embodiment may sequentially access data according to a Z-scan index in a coding unit included in a largest coding unit or a processing block. As described above with reference to FIGS. 3 and 4, the encoder 220 of the image encoding apparatus 200 according to an embodiment may split a reference coding unit into at least one coding unit. Here, coding units having a square shape and coding units having a non-square shape may be mixed in a reference coding unit. Since characteristics of an index according to a Z-scan order of a coding unit with respect to the image encoding apparatus 200 may be similar to those of the image decoding apparatus 100, details thereof are not provided again.

While this disclosure has been particularly shown and described with reference to embodiments thereof, it will be understood by those of ordinary skill in the art that various changes in form and details may be made therein without departing from the spirit and scope of the disclosure as defined by the appended claims. The embodiments should be considered in a descriptive sense only and not for purposes of limitation. Therefore, the scope of the disclosure is defined not by the detailed description of the disclosure but by the appended claims, and all differences within the scope will be construed as being included in the present disclosure.

The embodiments of the present disclosure can be written as computer programs and can be implemented in general-use digital computers that execute the programs using a computer readable recording medium. Examples of the computer readable recording medium include magnetic storage media (e.g., ROM, floppy disks, hard disks, etc.), optical recording media (e.g., CD-ROMs, or DVDs), etc.

The invention claimed is:
1. An image decoding method of decoding an image, the image decoding method comprising:
obtaining, from a bitstream, information indicates a size of a largest coding unit and information related to a size of a reference coding unit;
obtaining a plurality of largest coding units by splitting the image according to the information of the size of the largest coding unit;
determining a plurality of reference coding units by splitting a width and height of the largest coding unit, among the plurality of largest coding units, according to the information related to the size of the reference coding unit;

determining the reference coding unit, among the plurality of reference coding unis, as a first coding unit;

determining sub coding units split from the first coding unit based on information indicating whether the first coding unit is split vertically or horizontally into the sub coding units and whether the first coding unit is split into two sub coding units or three sub coding units; and when the sub coding units do not split into smaller sub coding units, decoding the sub coding units to reconstruct the image, wherein, when the first coding unit is split horizontally into the three sub coding units according to the information indicating whether the first coding unit is split vertically or horizontally into the sub coding units and whether the first coding unit is split into the two sub coding units or the three sub coding units, a center sub coding unit at the center of the three sub coding units is allowed to be further split horizontally into three sub coding units, and is not allowed to be further split horizontally into two sub coding units nor allowed to be further split into four sub coding units by dividing a width and a height of the center sub coding unit.

* * * * *